United States Patent
Katragada et al.

(10) Patent No.: US 11,550,917 B2
(45) Date of Patent: Jan. 10, 2023

(54) STANDARDIZED INTERFACE FOR INTELLECTUAL PROPERTY BLOCKS

(71) Applicant: Intel Corporation, Santa Clara, CA (US)

(72) Inventors: Aditya Katragada, Austin, TX (US); Prashant Dewan, Portland, OR (US); Karunakara Kotary, Portland, OR (US); Vinupama Godavarthi, El Dorado Hills, CA (US); Kumar Dwarakanath, Folsom, CA (US); Alex Izbinsky, Mevasseret-Zion (IL); Purushottam Goel, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 16/457,184

(22) Filed: Jun. 28, 2019

(65) Prior Publication Data
US 2019/0318097 A1 Oct. 17, 2019

(51) Int. Cl.
*G06F 21/57* (2013.01)
*G06F 21/72* (2013.01)
*G06F 9/445* (2018.01)

(52) U.S. Cl.
CPC ............ *G06F 21/572* (2013.01); *G06F 9/445* (2013.01); *G06F 21/72* (2013.01); *G06F 2221/033* (2013.01)

(58) Field of Classification Search
CPC ........ G06F 21/572; G06F 9/445; G06F 21/72; G06F 2221/033
See application file for complete search history.

(56) References Cited

U.S. PATENT DOCUMENTS

| | | | | |
|---|---|---|---|---|
| 9,106,229 | B1* | 8/2015 | Hutton | H01L 23/147 |
| 10,296,065 | B2* | 5/2019 | Lee | H04L 49/109 |
| 10,664,598 | B1* | 5/2020 | Righi | G06F 8/71 |
| 2001/0042243 | A1* | 11/2001 | Fish | G06F 9/44547 |
| | | | | 713/1 |
| 2004/0268107 | A1* | 12/2004 | Zimmer | G06F 9/4408 |
| | | | | 713/1 |
| 2008/0059730 | A1* | 3/2008 | Cepulis | G06F 11/1433 |
| | | | | 711/161 |
| 2008/0244553 | A1* | 10/2008 | Cromer | G06F 21/572 |
| | | | | 717/168 |

(Continued)

OTHER PUBLICATIONS

Krstic, S., et al., "Security of SoC Firmware Load Protocols," IEEE International Symposium on Hardware-Oriented Security and Trust (HOST); pp. 70-75 (May 6, 2014).

*Primary Examiner* — Aurel Prifti
(74) *Attorney, Agent, or Firm* — Patent Capital Group

(57) ABSTRACT

There is disclosed in one example, a system-on-a-chip (SoC), including: a processor core; a fabric; an intellectual property (IP) block communicatively coupled to the processor core via the fabric, the IP block having a microcontroller configured to provide a microcontroller architecture; a firmware load interface configured to provide a standardized hardware interface to the microcontroller architecture, wherein the standardized hardware interface provides an architecture-agnostic mechanism to securely load a firmware to the intellectual property block; and logic to provide a loader to load a firmware to the IP block via the firmware load interface.

20 Claims, 26 Drawing Sheets

(56) References Cited

U.S. PATENT DOCUMENTS

| | | | |
|---|---|---|---|
| 2009/0006832 A1* | 1/2009 | Stevens, Jr. | G06F 8/54 713/1 |
| 2011/0154062 A1* | 6/2011 | Whelihan | G06F 21/76 713/193 |
| 2013/0191651 A1* | 7/2013 | Muff | G06F 21/72 713/193 |
| 2016/0179161 A1* | 6/2016 | Adler | G06F 30/30 713/320 |
| 2016/0180001 A1* | 6/2016 | Adler | G06F 9/4411 716/138 |
| 2016/0180114 A1* | 6/2016 | Sastry | H04L 9/0643 713/189 |
| 2016/0188889 A1* | 6/2016 | Narendra Trivedi | G06F 21/6218 713/189 |
| 2016/0259312 A1* | 9/2016 | Caley | G06F 8/63 |
| 2017/0176524 A1* | 6/2017 | Dewan | G01R 31/31705 |
| 2018/0181757 A1* | 6/2018 | Pappu | G06F 21/44 |
| 2018/0260018 A1* | 9/2018 | Ehmann | G06F 1/3296 |
| 2020/0026505 A1* | 1/2020 | Olderdissen | G06F 9/44526 |
| 2020/0050543 A1* | 2/2020 | Hong | G06F 12/0646 |
| 2020/0351293 A1* | 11/2020 | Ponnuru | H04L 63/1433 |
| 2021/0303691 A1* | 9/2021 | Dewan | G06F 21/572 |

* cited by examiner

DASHBOARD BASE 1000

| DASHBOARD CONTROL POLICY REGISTER |
| --- |
| LOADER WRITE ACCESS CONTROL |
| VERIFIER WRITE ACCESS CONTROL |
| CAPABILITY IDENTIFIER 0 |
| CAPABILITY IDENTIFIER 1 |
| LOADER BASE |
| VERIFIER ERROR STATUS |
| VERIFIER ADDRESS AND STATUS 1 |
| VERIFIER SIZE 1 |

LOADER BASE 1010

| LOADER ERROR STATUS |
| --- |
| LOADER ADDRESS AND SIZE 1 |
| LOADER SIZE 1 |

⋮

| INTERRUPT MASK |
| --- |
| INTERRUPT STATUS CLEAR |

*Fig. 10*

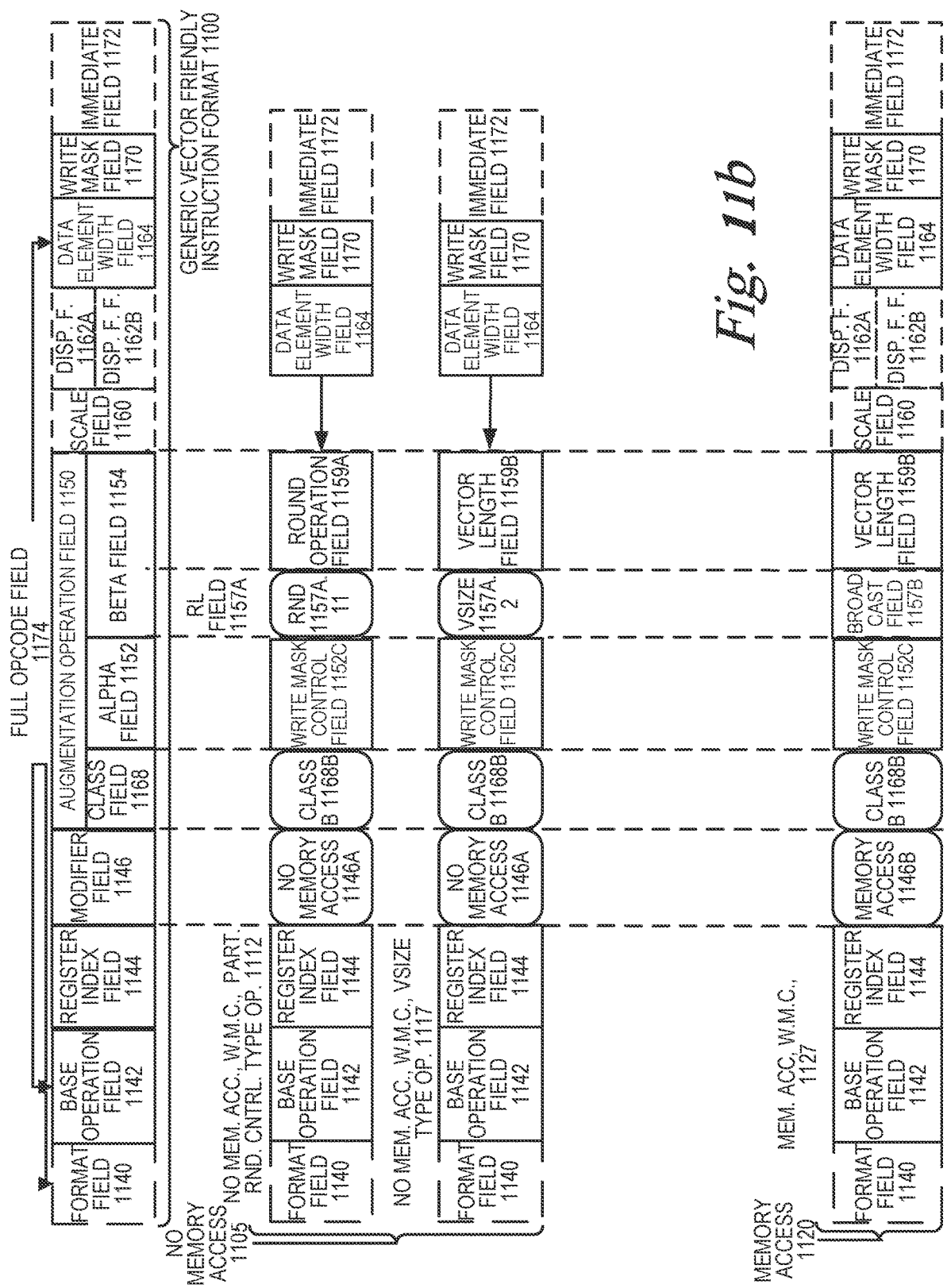

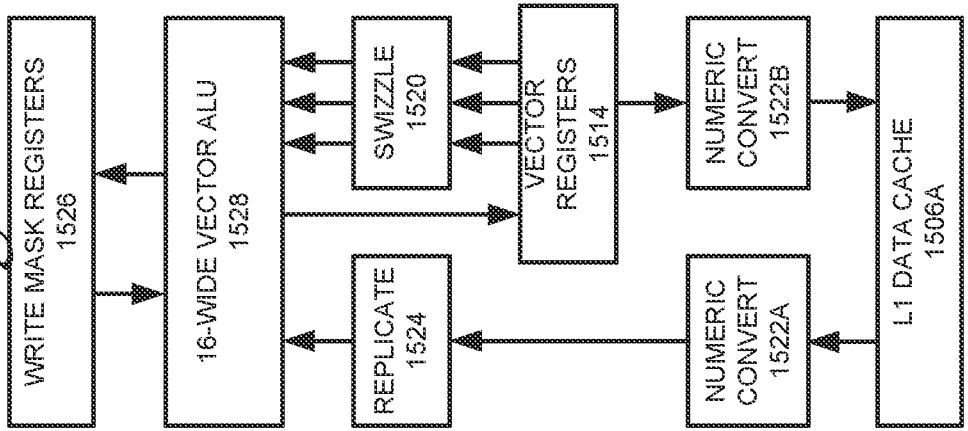
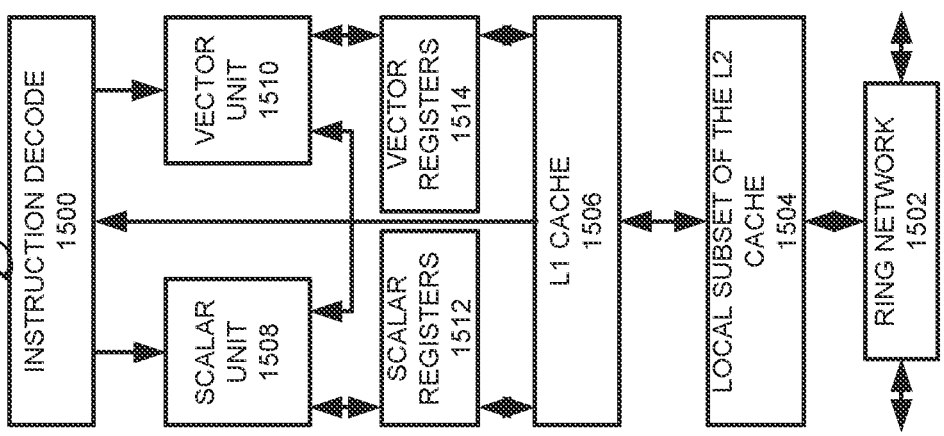

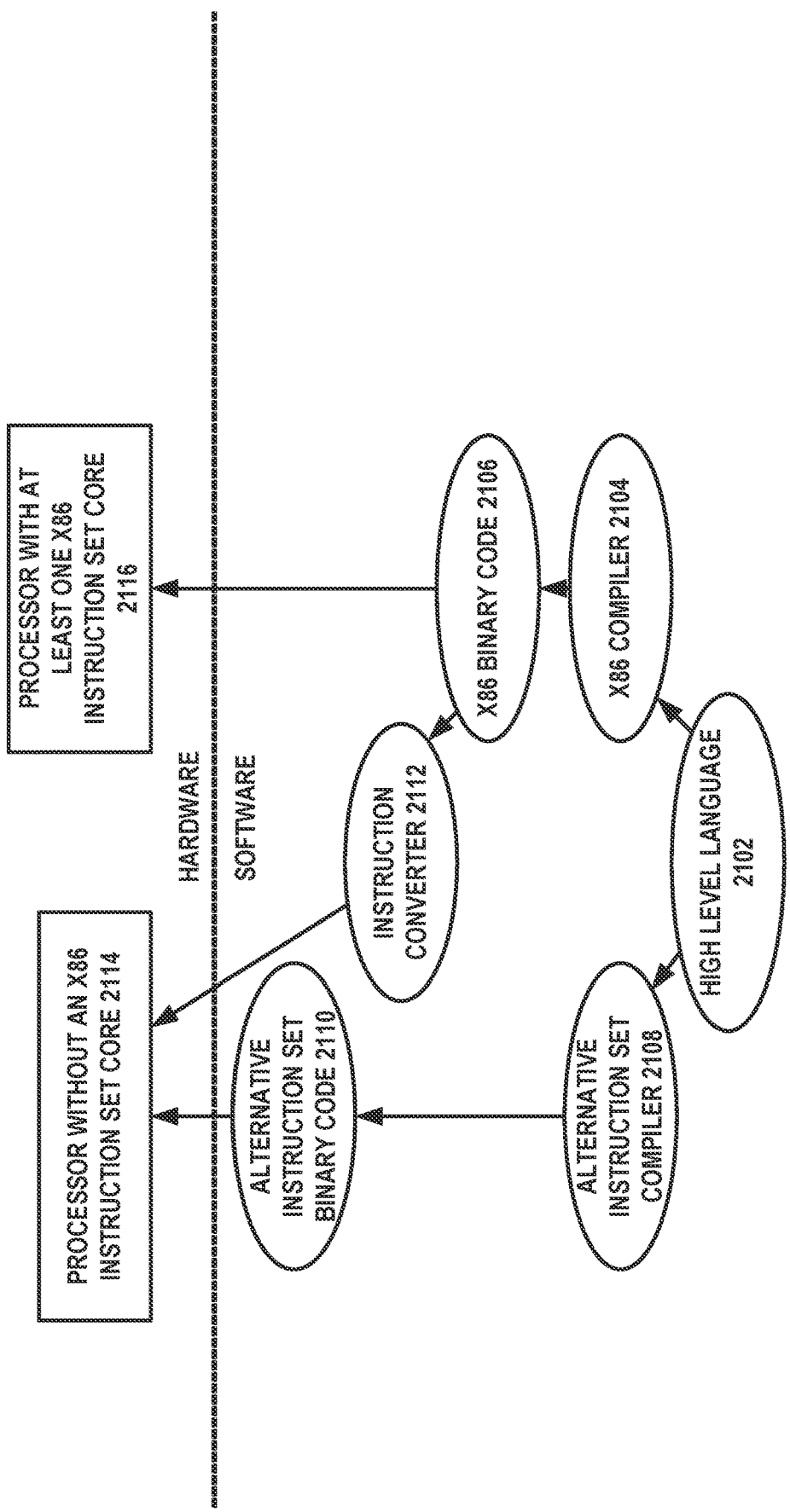

STANDARDIZED INTERFACE FOR INTELLECTUAL PROPERTY BLOCKS

FIELD OF THE SPECIFICATION

This disclosure relates in general to the field of semiconductor devices, and more particularly, though not exclusively, to a system and method for providing a standardized interface for intellectual property blocks.

BACKGROUND

Multiprocessor systems are becoming more and more common. In the modern world, compute resources play an ever more integrated role with human lives. As computers become increasingly ubiquitous, controlling everything from power grids to large industrial machines and personal computers to light bulbs, the demand for ever more capable processors increases.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 10 illustrates a dashboard base and a loader base.

FIGS. 11a-11b are block diagrams illustrating a generic vector-friendly instruction format and instruction templates thereof according to one or more examples of the present specification.

FIGS. 15a-15b illustrate a block diagram of a more specific in-order core architecture, which core would be one of several logic blocks (including other cores of the same type and/or different types) in a chip according to one or more examples of the present specification.

FIG. 21 is a block diagram contrasting the use of a software instruction converter to convert binary instructions in a source instruction set to binary instructions in a target instruction set according to one or more examples of the present specification.

EMBODIMENTS OF THE DISCLOSURE

Figure 1:
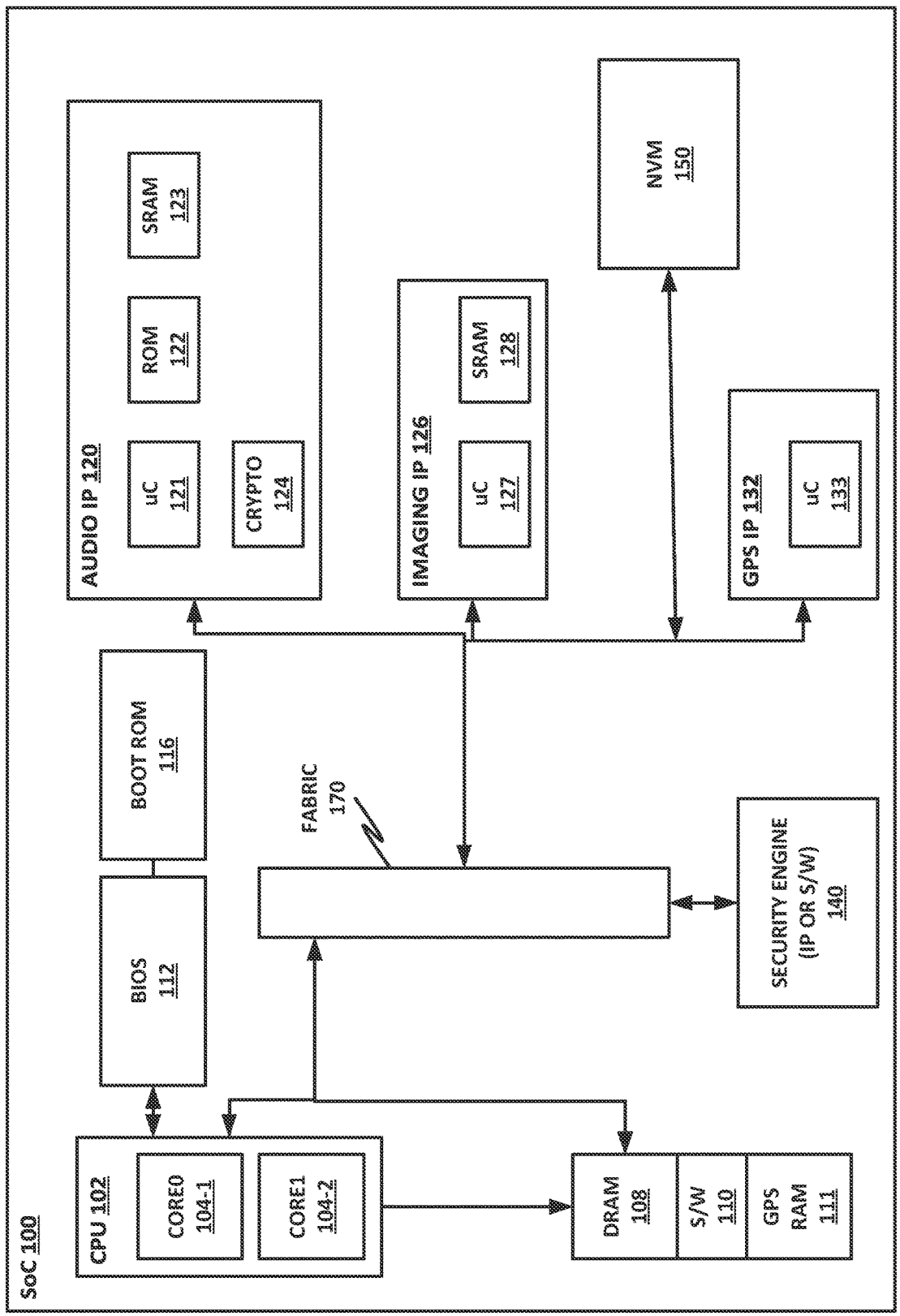
FIG. 1 is a block diagram of a system-on-a-chip (SoC).

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Designers of integrated circuits such as systems-on-a-chip (SoCs), microprocessors, microcontrollers, and other systems may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller, and the microcontroller has its own architecture, instruction sets, and firmware loading requirements. Because there is no standardized microcontroller architecture or set of firmware loading requirements, custom firmware loading procedures may be designed for each IP block.

In an illustrative example, an SoC integrator integrates IP blocks with controllers designed in-house and externally across a wide range of vendors, architectures, bus interfaces, and boot time characteristics. These may all be designed independently of one another, particularly with respect to the loading of the firmware that runs on the microcontrollers of the IP blocks. There is presently no hardware standard that exists with respect to IP block firmware loading mechanisms. This can make IP integration with SoCs difficult and expensive.

The requirement for custom flows for IP firmware loading has drawbacks. For example, it prevents the re-use of designs with different IP blocks. In some instances, vendor lock-in may occur, because the SoC has been designed around the IP block of a particular vendor. Replacing the IP block with a functionally identical IP block from a different vendor may be expensive, because the firmware loading mechanism needs to be completely redesigned. This increases the cost of SoC and software integration. It also increases the effort required for security validation, and overall increases the cost of all stages of the security development lifecycle (SDL).

The present specification describes a firmware load interface, also called a "dashboard," that provides a standard mechanism for loading firmware to an IP block. The hardware dashboard may be provided either internally within the IP block, or, for compatibility with legacy IP blocks that lack the firmware dashboard, the firmware dashboard itself could be provided as a separate IP block. The hardware dashboard has an IP-facing interface that provides customized instructions and processes specific to the IP, and also includes a system-facing interface that provides a standardized interface common to all IP blocks or classes of IP blocks. This provides a vendor-agnostic firmware load interface which ensures that if an IP block is replaced with a functionally similar or identical IP block from another vendor, the system does not need to be redesigned. This can provide either a direct, drop-in replacement (i.e., in a case where the firmware dashboard is provided internally to the IP block), or, at worst, the firmware dashboard IP is replaced with the corresponding firmware dashboard IP for the vendor of the new IP block. Other aspects of the system, including BIOS, firmware, and software, need not be compatible with the new IP block, because they are able to operate with the standardized firmware dashboard.

The firmware dashboard provides an interface that is not only vendor-agnostic, but also architecture-agnostic. ARM, AMD, Intel®, and other architectures can be integrated with any IP that provides a corresponding firmware dashboard. In cases where a trusted execution environment (TEE) is used for security, the firmware dashboard may also be compatible with, for example, Trusty, VBS, security controller, early BIOS, or any other TEE mechanism. This allows for TEE-agnostic loading of secure firmware for devices. For example, the firmware dashboard could be used on an ARM, AMD, or Intel® SoC, and may be used to integrate IP blocks from any number of vendors. This provides not only secure input/output (I/O), but also secure offloading of compute functionality to accelerators, which is useful in data centers.

The firmware dashboard of the present specification overcomes difficulties that arise because multiple architectures and multiple TEEs exist in common usage today. IP providers generally have their own, independently-designed hardware and custom expectations for software for their IP firmware. In the absence of a common mechanism, it can be very difficult for an SoC integrator to mix-and-match IP to multiple vendors. Furthermore, some vendors couple firmware loading of one IP with other IPs, thereby creating intractable dependencies. For example, if IP A is dependent on IP B to load secure firmware, and IP B is dependent on IP C and fabric D for its existence, the SoC design becomes challenging and sub-optimal.

The present specification implements a hardware widget known as a firmware load interface for a firmware "dashboard" that extracts information required for IP firmware loading, and exposes a general standard interface external to the IP. Even though the IP is designed with custom flows, it has some generic expectations for external agents, and architecture for firmware verification and loading. The firmware dashboard disclosed herein uses these generalizations to create standard hardware widgets that are universally pluggable, and provide a standard external flow for firmware loading and verification. Internal implementations on the IP side may still be different from IP to IP.

The firmware dashboard supports multiple styles of access control, including, for example, range-based, TLP bit-based, and access control based on boot stages. Furthermore, it encapsulates all interactions between the IP and the SoC, as well as the IP and other IPs inside the SoC for IP firmware management.

Advantageously, IPs may be designed independently of one another, which SoCs they're integrated into, and which OS or software are used on those SoCs. So with the firmware dashboard, IPs can be reused across many different architectures. Furthermore, software components such as BIOS or OS drivers may re-use IP firmware load modules from one IP to another, and also port from one platform to another, or from one ecosystem to another. This enables fast SoC integration with reduced validation costs in software for third-party IPs. It also provides improved security assurance with respect to IP firmware integrity, due to standardization.

The present specification illustrates the use of a firmware load interface, or dashboard, in terms of three flavors of IP blocks. It should be noted that these flavors are presented for illustrative purposes only, and that other types of IP blocks with other firmware load characteristics may be provided.

Flavor 1 is an IP with a read-only memory (ROM) and built-in hardware crypto. This IP block is able to establish its own root of trust, but depends on an external agent like an operating system or another controller to copy the firmware to an SoC-addressable memory for it to load. The IP may then use direct memory access (DMA) to access and verify the firmware, and to start executing it.

Flavor 2 is an IP with no ROM or crypto. It depends purely on an external entity to verify the integrity of the firmware, and download it into an internal random access memory (RAM), such as a static RAM (SRAM) or a register file.

Flavor 3 is an IP with no internal ROM or crypto. It expects an external agent to load and verify the firmware. The external agent must then point the firmware to the IP. The IP directly executes from that external memory. For example, FIG. 1 illustrates an SoC that includes all three flavors of IP discussed here.

A system and method for providing a standardized interface for intellectual property blocks will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Certain of the FIGURES below detail example architectures and systems to implement embodiments of the above. In some embodiments, one or more hardware components and/or instructions described above are emulated as detailed below, or implemented as software modules.

FIG. 1 is a block diagram of a system-on-a-chip (SoC) 100. SoC 100 is provided as an illustration of a platform that may use the teachings of the present specification. But it should be understood that SoC 100 is a nonlimiting and illustrative example only. Other systems, and in particular other integrated circuits, could successfully apply the teachings of the present specification.

SoC 100 in this example includes all three flavors of IP blocks discussed above.

SoC 100 includes a central processing unit (CPU) 102 comprising two cores, core 0 104-1 and core 1 104-2. A multicore CPU is provided here by way of illustrative and nonlimiting example. In other embodiments, other numbers of cores may be provided, including a single core, or multiple cores such as 4 cores, 8 cores, 12 cores, 16 cores, 24 cores, 32 cores, 64 cores, 128 cores, or any other suitable number of cores. CPU 102 and/or core 104 may include a number of registers, as discussed further below with regard to FIG. 2.

CPU 102 may be bootstrapped by a BIOS 112, which may load firmware from a boot ROM 116.

CPU 102 communicatively couples to a dynamic RAM 108, which may have running therein software 110, and may also have a copy of GPS RAM 111. GPS RAM 111 may be used for one of the IP blocks, particularly in this case GPS IP 132. Dynamic random access memory (DRAM) 108 may have copies of other information, data, and/or instructions. Data and instructions may in some cases be loaded from a different source, such as a storage or a nonvolatile memory 150.

SoC 100 includes a fabric 170 that is used to communicatively couple different portions of SoC 100 with one another. Fabric 170 could include, by way of nonlimiting example, a Northbridge, Southbridge, Intel® On-Chip System Fabric (IOSF), Intel® Uncore, Intel® Omni-Path Interconnect, or any other fabric, communication process, or buses that may be used to interconnect various pieces of SoC 100. It should be particularly noted that although SoC 100 shows certain interconnects between discrete devices and fabric 170, this is not to imply a necessary relationship between these interconnects. In various embodiments, any of the devices illustrated here may be interconnected in any suitable fashion.

SoC 100 includes a security engine 140, which may in various embodiments be an IP block, software, firmware, or any combination of the above. Security engine 140 may include, for example, a TEE, and may include instructions, microcode, software, firmware, or other processes that provide security. Security engine 140 may in particular be responsible for verifying the firmware loaded to the various IP blocks, including audio IP 120, imaging IP 126, and GPS IP 132.

SoC 100 is shown with three flavors of IP block, to illustrate the operation of different types of IPs within the teachings of the present specification. IP blocks 120, 126, and 132 may or may not be configured with a firmware dashboard according to the teachings of the present specification. If one or more of these IP blocks do not include a firmware dashboard, then it will be necessary to design SoC 100 with specialized firmware load flows for each IP block that does not include the firmware dashboard. On the other hand, any IP blocks that include an appropriate firmware dashboard can be loaded via standardized firmware load flows.

The IP blocks disclosed herein, such as audio IP 120, imaging IP 126, and GPS IP 132 are IPs that may commonly be used in an SoC used for a mobile telephone, tablet, or similar device. However, it should be understood that these are disclosed by way of nonlimiting example only. SoC 100 could as easily be an SoC for a server blade in a data center, or an SoC for any other purpose.

IP blocks 120, 126, and 132 may in one example be "self-sufficient" IPs. These are IPs that are fully self-sufficient and have no external component dependency. In other words, as long as they are used in the design and given the appropriate inputs and outputs, they can fully function.

The firmware load flow for the various IP blocks may be provided in various different models. For example, a firmware load flow could be provided in a push model. In a push model, the IP expects an external controller to push the firmware into its RAM. For example, imaging IP 126 may expect CPU 102 to push the firmware image into SRAM 128.

In a pull model, an IP expects to pull its own firmware image into internal RAM. For example, audio IP 120 may employ a pull model for loading IP firmware. In this case, CPU 102 provides to audio IP 120 an address that audio IP 120 can access to pull the firmware image into SRAM 123 or ROM 122. A variant of the pull model is when the IP does not pull the firmware internally but executes the firmware from external memory. For example, GPS IP 132 in this illustration does not have an internal SRAM. GPS IP 132 may receive from CPU 102 an address, and GPS IP 132 may access that address from DRAM 108, and may execute its firmware from DRAM 108.

In this illustration, three IP blocks are disclosed for illustration purposes. Audio IP 120 includes a microcontroller 121. Audio IP 120 also includes a ROM 122, an SRAM 123, and an internal crypto module 124. Audio IP 120 is disclosed as an example of a "Flavor 1" IP. This IP has a ROM and built-in hardware crypto capabilities to establish its own root of trust. However, audio IP 120 still relies on an external agent such as an operating system running within DRAM 108, or a controller such as CPU 102, to copy the firmware to an SoC-addressable memory for it to load. Audio IP 120 may then access that memory via DMA, and verify the firmware image via crypto module 124. Audio IP 120 may then begin executing the loaded firmware.

Imaging IP 126 includes a microcontroller 127 and an SRAM 128. Microcontroller 127 may be different from microcontroller 121, and may have a different instruction set and architecture. Imaging IP 126 may have a completely different firmware load process from audio IP 120.

Imaging IP 126 is provided as an example of a "Flavor 2" IP. Imaging IP 126 has no ROM or hardware crypto module. Rather, imaging IP 126 purely depends on an external entity such as CPU 102 and security engine 140 to verify the integrity of its firmware. Imaging IP 126 also relies on an external entity such as CPU 102 to download the firmware image into SRAM 128 or a register file. Once the firmware image is verified and loaded into SRAM 128, imaging IP 126 can begin executing the firmware image.

GPS IP 132 has a microcontroller 133. Microcontroller 133 may be different from microcontroller 127 and microcontroller 121, including having a completely different instruction set and architecture. GPS IP 132 may have a different firmware load process from both imaging IP 126 and audio IP 120.

GPS IP 132 is provided as an example of a "Flavor 3" IP. GPS IP 132 has no internal ROM or crypto module. Rather, it expects an external agent such as CPU 102 and/or security engine 140 to verify the firmware image. It then expects an external agent such as CPU 102 to point it to the IP firmware image. For example, CPU 102 may provide to GPS IP 132 a pointer to GPS RAM 111 within DRAM 108. GPS IP 132 may then execute GPS RAM 111 directly from DRAM 108.

IP blocks 120, 126, and 132 are provided as three examples of different flavors of IP blocks. In practice, there may be any number of combinations that exist in the industry based on a number of factors. These factors may include, by way of illustrative and nonlimiting example:
1. Crypto capability internal and external to the IP.
2. IP designed with or without a ROM to establish a root of trust (ROT).
3. If the IP's controller executes from internal (to IP) RAM or from external RAM (e.g., RAM within the SoC).
4. If the IP can pull in firmware by itself, or requires some external agent to push the firmware into it.
5. If the SoC integrating the IP has a security controller that can be trusted with respect to the security requirements for the SoC's use case.
6. The number of stages of firmware for each IP. Some IPs load firmware only once. Other IPs load firmware multiple times in different stages of boot and operation.

In the absence of a firmware dashboard for IPs 120, 126, and 132, software 110 running on CPU 102 would have to implement three separate flows for each of the three IP blocks. There is no reusable flow among these three different IPs.

In the case that SoC 100 also includes a trust requirement, if security engine 140 needs to play the role of verifier for imaging IP 126 and GPS IP 132, it will not have a flow that it can inherit from software 110. In this embodiment, the software architecture for SoC 100 must be defined at IP design time, and is not flexible at SoC integration time.

Figure 2:
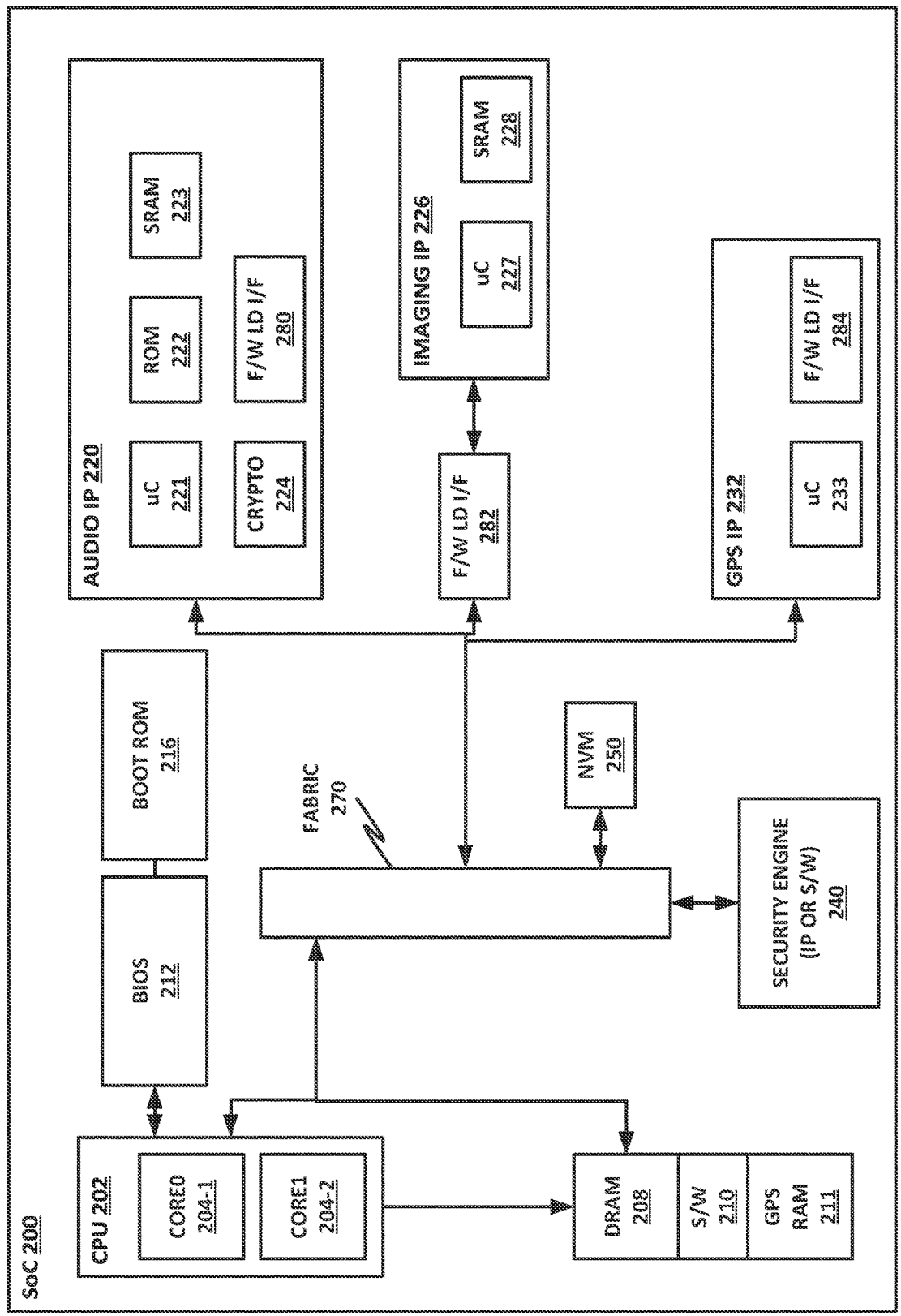
FIG. 2 illustrates an SoC with a number of firmware load interfaces, also known as firmware dashboards.

FIG. 2 is a block diagram of an SoC 200. SoC 200 is provided as an illustration of a platform that may use the teachings of the present specification. But it should be understood that SoC 200 is a nonlimiting and illustrative example only. Other systems, and in particular other integrated circuits, could successfully apply the teachings of the present specification.

SoC 200 in this example includes all three flavors of IP blocks discussed above.

SoC 200 includes a CPU 202 comprising two cores, core 0 204-1 and core 1 204-2. A multicore CPU is provided here by way of illustrative and nonlimiting example. In other embodiments, other numbers of cores may be provided, including a single core, or multiple cores such as 4 cores, 8 cores, 12 cores, 16 cores, 24 cores, 32 cores, 64 cores, 128 cores, or any other suitable number of cores. CPU 202 and/or cores 204 may include a number of registers, as discussed further below with regard to FIG. 2.

CPU 202 may be bootstrapped by a BIOS 212, which may load firmware from a boot ROM 216.

CPU 202 communicatively couples to a dynamic RAM 208, which may have running therein software 210, and may also have a copy of GPS RAM 211. GPS RAM 211 may be used for one of the IP blocks, particularly in this case GPS IP 232. DRAM 208 may have copies of other information, data, and/or instructions. Data and instructions may in some cases be loaded from a different source, such as a storage or a nonvolatile memory 250.

SoC 200 includes a fabric 270 that is used to communicatively couple different portions of SoC 200 with one another. Fabric 270 could include, by way of nonlimiting example, a Northbridge, Southbridge, Intel® On-Chip System Fabric (IOSF), Intel® Uncore, Intel® Omni-Path Interconnect, or any other fabric, communication process, or buses that may be used to interconnect various pieces of SoC 200. It should be particularly noted that although SoC 200 shows certain interconnects between discrete devices and fabric 270, this is not to imply a necessary relationship between these interconnects. In various embodiments, any of the devices illustrated here may be interconnected in any suitable fashion.

SoC 200 includes a security engine 240, which may in various embodiments be an IP block, software, firmware, or any combination of the above. Security engine 240 may include, for example, a TEE, and may include instructions, microcode, software, firmware, or other processes that provide security. Security engine 240 may in particular be responsible for verifying the firmware loaded to the various IP blocks, including audio IP 220, imaging IP 226, and GPS IP 232.

The IP blocks disclosed herein, such as audio IP 220, imaging IP 226, and GPS IP 232 are IPs that may commonly be used in an SoC used for a mobile telephone, tablet, or similar device. However, it should be understood that these are disclosed by way of nonlimiting example only. SoC 200 could as easily be an SoC for a server blade in a data center, or an SoC for any other purpose.

IP blocks 220, 226, and 232 may in one example be "self-sufficient" IPs. These are IPs that are fully self-sufficient and have no external component dependency. In other words, as long as they are used in the design and given the appropriate inputs and outputs, they can fully function.

The firmware load flow for the various IP blocks may be provided in various different models. For example, a firmware load flow could be provided in a push model. In a push model, the IP expects an external controller to push the firmware into its RAM. For example, imaging IP 226 may expect CPU 202 to push the firmware image into SRAM 228.

In a pull model, an IP expects to pull its own firmware image into internal RAM. For example, audio IP 220 may employ a pull model for loading IP firmware. In this case, CPU 202 provides to audio IP 220 an address that audio IP 220 can access to pull the firmware image into SRAM 223 or ROM 222. A variant of the pull model is when the IP does not pull the firmware internally but executes the firmware from external memory. For example, GPS IP 232 in this illustration does not have an internal SRAM. GPS IP 232 may receive from CPU 202 an address, and GPS IP 232 may access that address from DRAM 208, and may execute its firmware from DRAM 208.

In this illustration, three IP blocks are disclosed for illustration purposes. Audio IP 220 includes a microcontroller 221. Audio IP 220 also includes a ROM 222, an SRAM 223, and an internal crypto module 224. Audio IP 220 is disclosed as an example of a "Flavor 1" IP. This IP has a ROM and built-in hardware crypto capabilities to establish its own root of trust. However, audio IP 220 still relies on an external agent such as an operating system running within DRAM 208, or a controller such as CPU 202, to copy the firmware to an SoC-addressable memory for it to load. Audio IP 220 may then access that memory via DMA, and verify the firmware image via crypto module 224. Audio IP 220 may then begin executing the loaded firmware.

Imaging IP 226 includes a microcontroller 227 and an SRAM 228. Microcontroller 227 may be different from microcontroller 221, and may have a different instruction set and architecture. Imaging IP 226 may have a completely different firmware load process from audio IP 220.

Imaging IP 226 is provided as an example of a "Flavor 2" IP. Imaging IP 226 has no ROM or hardware crypto module. Rather, imaging IP 226 purely depends on an external entity such as CPU 202 and security engine 240 to verify the integrity of its firmware. Imaging IP 226 also relies on an external entity such as CPU 202 to download the firmware image into SRAM 228 or a register file. Once the firmware image is verified and loaded into SRAM 228, imaging IP 226 can begin executing the firmware image.

GPS IP 232 has a microcontroller 233. Microcontroller 233 may be different from microcontroller 227 and microcontroller 221, including having a completely different instruction set and architecture. GPS IP 232 may have a different firmware load process from both imaging IP 226 and audio IP 220.

GPS IP 232 is provided as an example of a "Flavor 3" IP. GPS IP 232 has no internal ROM or crypto module. Rather, it expects an external agent such as CPU 202 and/or security engine 240 to verify the firmware image. It then expects an external agent such as CPU 202 to point it to the IP firmware image. For example, CPU 202 may provide to GPS IP 232 a pointer to GPS RAM 211 within DRAM 208. GPS IP 232 may then execute GPS RAM 211 directly from DRAM 208.

IP blocks 220, 226, and 232 are provided as three examples of different flavors of IP blocks. In practice, there may be any number of combinations that exist in the industry based on a number of factors. These factors may include, by way of illustrative and nonlimiting example:
1. Crypto capability internal and external to the IP.
2. IP designed with or without a ROM to establish a root of trust (ROT).
3. If the IP's controller executes from internal (to IP) RAM or from external RAM (e.g., RAM within the SoC).
4. If the IP can pull in firmware by itself, or requires some external agent to push the firmware into it.
5. If the SoC integrating the IP has a security controller that can be trusted with respect to the security requirements for the SoC's use case.
6. The number of stages of firmware for each IP. Some IPs load firmware only once. Other IPs load firmware multiple times in different stages of boot and operation.

In the case that SoC 200 also includes a trust requirement, if security engine 240 needs to play the role of verifier for imaging IP 226 and GPS IP 232, it will not have a flow that it can inherit from software 210. In this embodiment, the software architecture for SoC 200 must be defined at IP design time, and is not flexible at SoC integration time.

SoC 200 is different from SoC 100 in that SoC 200 specifically provides a number of firmware load interfaces, also known as firmware dashboards.

Specifically, audio IP 220 includes, internal to itself, firmware load interface 280. Imaging IP 226 is a legacy IP that does not include an integrated firmware dashboard. But the vendor of imaging IP 226 does provide a separate IP block, namely firmware load interface 282. Firmware load interface 282 provides a firmware dashboard external to imaging IP 226. Thus, by using firmware load interface 282 along with imaging IP 226, the result is equivalent to using an imaging IP with an internal firmware dashboard.

GPS IP 232 includes internal firmware load interface 284.

In SoC 100 of FIG. 1, if firmware dashboards are not provided for the IPs, then software running on main CPU 102 may need to implement three separate flows for each of the three disclosed IP blocks. There is no reusable flow among these three IPs.

However, in the case of SoC 200, a standardized firmware load flow can be provided. SoC 200 may have a specified trust requirement. If security engine 240 needs to play the role of verifier for imaging IP 226 and GPS IP 232, it may inherit a flow from software running on the host CPU. This inheritance may not be possible without the use of the firmware dashboards illustrated herein.

An embodiment of the firmware dashboard provided by firmware load interfaces 280, 282, and 284 extracts common elements of the firmware loading for each of the possible combinations, and creates a standard interface for software to load firmware into these IPs. Common elements may include the following.

Enumeration capabilities: This pertains to information that software running in external agents could use to enumerate the IP and understand what its capabilities are. This may describe, for example, if the IP has a crypto capability, if it expects a pull model (if the IP itself pulls the firmware), if it has a multi-stage loading, and other information helpful in identification of firmware for the IP device and revision identifiers.

Loader-related information: This pertains to information exchanged between the IP and external agents, with respect to where in system memory is the IP's firmware image. For example, the firmware image may be loaded from a flash storage, and thus, the loader may be required to pull the image from the flash storage. An IP may use this to pull the firmware itself if it has a ROM and crypto to establish image integrity. Otherwise, other agents may play the role of a firmware verifier (e.g., security engine 240). In that case, the security engine may use the loader-related information to verify the integrity of the firmware image.

Verifier-related information: This pertains to information related to integrity verification of the firmware image that will execute the IP block. This information may be used by the IP hardware to either deny or accept the firmware image being loaded.

Interrupt and error statuses: This set of information relates to generic, doorbell-like events or status change events. These can be used to interrupt software components running on the IP or the host when certain events in the IP loading flow occur.

The firmware loading procedure described herein takes the above common elements and provides a unified and consistent standard interface to the external world from the IP, with respect to the firmware load. It also abstracts implementation details or differences within the IP blocks, themselves. Advantageously, external software components and controllers can implement a single unified flow for firmware load for all IPs. IPs that are not natively designed to meet the hardware standard could be enabled to use the standard via a sham or buttress-like interface, or a standalone hardware widget (e.g., firmware dashboard 282) could also be provided.

In the implementation illustrated in FIG. 2, every IP in the SoC may have a standard interface and a standard unified flow for firmware load, even though the internal interface from the firmware load register to the IP's actual firmware load mechanism may be different. Note that every IP supporting the firmware dashboard is a desirable target in many cases, but is not an absolute requirement. Replacing unsupported IPs with supported IPs may incrementally simplify SoC design, as the need for special load flows is incrementally eliminated. Thus, this specification expressly anticipates an embodiment wherein IP blocks with firmware dashboards are mixed with IP blocks without firmware dashboards.

A subset of register definitions useful in building an example firmware dashboard are described in this specification. These register definitions should be understood to be nonlimiting examples, and other register definitions may be used to carry out the teachings of the present specification.

The internal implementation from the firmware load interface registers to the actual IP may be different, as long as the addressing mode to reach the firmware load interface registers is standard. For example, peripheral component interconnect (PCI) enumerable or fixed memory-mapped offsets may be used. The security mechanism to reach those addresses may also be consistent via hardware-based attributes like secure and non-secure bits in ARM's TrustZone, or the security attributes of initiator (SAI) bits used to uniquely identify source agents for target-based access control.

Note that that the relationship between the dashboard base and loader base of the present specification is further discussed in the description of FIG. 10, below.

TABLE 2

Control Policy

| Bits | Access Type | Default | Description |
|---|---|---|---|
| 64:0 | RW | Parameter | Programmable bits to identify agents that can change this register, the Loader and verifier Write Access Control registers and all other registers in the dashboard. Reads accesses are not restricted. |

TABLE 1

Control Register Summary (Minimum Required List)

| Base Address | Offset Address | Name | Mandatory | Description |
|---|---|---|---|---|
| Dashboard_Base | 0x0 | Dashboard CP | Yes | Control Policy for Dashboard |
| Dashboard_Base | 0x8 | Dashboard Loader WAC | Yes | Write Access Control for the Loader Registers |
| Dashboard_Base | 0x10 | Dashboard Verifier WAC | Yes | Write Access Control for the Verifier Registers |
| Dashboard_Base | 0x18 | IP Loader and Verifier Cap0 | Yes | Register describing the IP's capabilities when it comes to loading and verifying images. |
| Dashboard_Base | 0x20 | IP Loader and Verifier Cap1 | Yes | Register describing the IP's capabilities when it comes to loading and verifying images. |
| Dashboard_Base | 0x30 | Verification error status | Yes | This register is used to capture the errors during verification. |
| Dashboard_Base | 0x40 | Verification Address and Status Register 1 | Yes | This register describes the address information that is passed on from the verifier to the IP after verification is done. |
| Dashboard_Base | 0x48 | Verifier Size Register 1 | Yes | This register describes the size of the firmware verified by the verifier at the address described in the loading address register. |
| Loader_Base | 0x30 | Loading error status | Yes | This register is used to capture the errors during loading. |
| Loader_Base | 0x40 | Loading Address and Status Register 1 | Yes | This register describes the address information that is passed on from the loader to the verifier after loading is done. |
| Loader_Base | 0x48 | Loader Size Register 1 | Yes | This register describes the size of the firmware loaded by the loader at the address described in the loading address register. |
| Loader_Base | 0x34 | Interrupt Mask Register | Yes | This register enables various interrupts in the flow. |
| Loader_Base | 0x38 | Interrupt Status Clear Register | Yes | This register enables clearing of the interrupt by the interrupt handler in the flow. |

TABLE 3

Loader Write Access Policy

| Bits | Access Type | Default | Description |
|---|---|---|---|
| 64:0 | RW | Parameter | Programmable bits to identify agents that can write the dashboard registers related to the Loader. Reads accesses are not restricted. The writes to this register should only be allowed to agents listed in the Control Policy Register. |

TABLE 4

Verifier Write Access Policy

| Bits | Access Type | Default | Description |
|---|---|---|---|
| 64:0 | RW | Parameter | Programmable bits that can write the dashboard registers related to the verifier. Reads accesses are not restricted. The writes to this register should only be allowed to agents listed in the Control Policy Register. |

TABLE 5

IP Loader and Verifier Capabilities (IP Info Register 1)

| Bits | Access Type | Default | Description |
|---|---|---|---|
| 63:36 | RO | 1'h0 | RESERVED |
| 47:44 | RO | Parameter | IP expects Push model |
| 43:36 | RO | 8'h0 | Reserved |
| 35:32 | RO | Parameter/fuse/strap | Verifier capability expected via another SoC IP (Example Security IP) |
| 31:28 | RO | Parameter/fuse/strap | Loader Capabilities expected via another SoC IP (Example Security IP) |
| 27:24 | RO | Parameter/fuse/strap | Verifier Capability expected via IA SW/TEE |
| 23:20 | RO | Parameter/fuse/strap | Loader Capabilities expected via IA SW/TEE |
| 19:16 | RO | Parameter/fuse/strap | Verifier Capability expected via BIOS |
| 15:12 | RO | Parameter/fuse/strap | Loader Capabilities expected via BIOS |
| 11:8 | RO | Parameter/fuse/strap | Verifier Capability is built within IP itself |
| 7:4 | RO | Parameter/fuse/strap | Loader Capabilities is built within IP itself |
| 3:3 | RO | Parameter/fuse/strap | Inline Hashing supported by IP. There is no current usage for this feature in Dashboard 1.0 |
| 2:0 | RO | 3'b0 | Reserved |

TABLE 6

IP loader and verifier Capabilities 2 (IP Info Register 2)

| Bits | Access Type | Default | Description |
|---|---|---|---|
| 63:36 | RO | 8'h0 | Reserved |
| 35:32 | RO | 4'h0 | Reserved |
| 31:28 | RO | 4'h0 | Debug Policy/Mode enabled This field should be used by the IP to reflect any non-production related states that the IP would like to inform the Loaders and verifiers. This should be used by IP's to reflect the below information SoC Life Cycle states SoC debug modes SW defined encodings for any SW debug modes Loaders and Verifiers are expected to use these bits to detect debug situations. |
| 27:24 | RO | 8'h0 | FLF Spec version 0: Dashboard 1.0 1: Dashboard 1.1 Current POR is Dashboard 1.0 Dashboard 1.1 will include support for data and push flows |
| 23:16 | RO | Parameter/strap | Revision ID. This field should be connected to the PCI Revision ID of the IP. It along with the Device ID will provide a unique ID that loader and verifier agents check to ensure correct firmware is being loaded and verified |
| 15:0 | RO | Parameter/strap | IP Device ID. This field should reflect the PCI Device ID of the IP. It along with the Revision ID will provide a unique ID that loader and verifier agents check to ensure correct firmware is being loaded and verified |

TABLE 7

Loader Base Address Register

| Bits | Access Type | Default | Description |
|---|---|---|---|
| 63:0 | RO | Parameter/Strap | This Register provides the offset of the Loader base address from the dashboard_base address register |

TABLE 8

Loading Address Register 1

| Bits | Access Type | Default | Description |
|---|---|---|---|
| 63:0 | RWO | 64'h0 | Physical address of the image for the verifier to verify. This register is updated by the loader once it has finished copying the IP's firmware image blobs into a physical address in the SoC's memory map. These bits should be set before the Loading done bit is set. The address is aligned to a single dword. |

TABLE 9

Loading Size and Status Register 1

| Bits | Access Type | Default | Description |
|---|---|---|---|
| 63:32 | RWO | 32'h0 | Size of the image for the verifier to verify in KB's. Loader agents need to update |

TABLE 9-continued

Loading Size and Status Register 1

| Bits | Access Type | Default | Description |
|---|---|---|---|
| | | | this register before updating the loading done bit. |
| 31:18 | RO | 28'h0 | Reserved |
| 17:17 | RWO | 1'h0 | Verifier copy done: This is an optional bit set by the verifier after it has consumed the FW image form he loader and should be used if it needs to communicate to the loader that the buffer indicated by this pair of address and size register can now be reclaimed by the Loader. Note that usage of this bit will imply that the verifier should also be in the WAC of the loader registers. |
| 16:16 | RWO | 1'h0 | IP ready for FW download: Optional bits one for each of the four FW instances. These bits should be set by the IP HW or IP ROM when the IP is out of reset and wants to inform outside controllers of that state so that they could begin the enumeration process for FW load. These bits should be connected to an interrupt to the verifier either via MSI or via SB message to the agent designated as the loader according to the IP Capabilities register. |
| 15:4 | RO | | Reserved |
| 3:1 | RWO | 3'h0 | Reserved |
| 0:0 | RWO | 1'h0 | Loading Done: When this bit is set, it will inform the verifier that the firmware has successfully loaded into the physical memory address in bits 63:3. This bit along with the bits in the Loading error status register provide the status of the loading if loading was triggered but not completed. IP's could further optimize the usage of this bit by connecting it to an interrupt towards the host or the IP's controller. |

TABLE 10

Verification Address Register 1
(These registers would become optional in case the IP itself plays the role of the verifier or does not need to communicate with an external agent for verification.)

| Bits | Access Type | Default | Description |
|---|---|---|---|
| 63:0 | RWO | 64'h0 | Physical address of the image after the verifier has integrity verified the image. This region should point to an integrity protected region only accessible to the verifier and the IP. Please refer to the Security rules in section 2.1.6 that need to be met for this region. This address is expected to be used by the IP to fetch the verified image into its local RAM's or to execute from. This register is updated by the verifier once it has finished verifying the IP's firmware image blobs into a physical address in the SoC's memory map. These bits should be set before the verifying done bit is set. The address is aligned to a single dword. |

TABLE 11

Verification Size and Status Register 1

| Bits | Access Type | Default | Description |
|---|---|---|---|
| 63:32 | RWO | 32'h0 | Size of the image verified by the verifier in KB's. Please note that this could only be the first block being verified. The IP could chose to use this first block of 4 KB to pass on additional information on the firmware like if it's not in contiguous memory, the address for the next block and the RS information to access it. |
| 31:19 | RO | 28'h0 | Reserved |
| 18:18 | RW | 1'h0 | Update data region done. This bit is only applicable when this dashboard instance is used for data and not FW. This bit should be set by the verifier indicating to the IP that the data update to flash is completed. This bit is not in dashboard 1.0 |
| 17:17 | RO | 1'h0 | Update data Region: This bit is only applicable when this dashboard instance is used for data and not FW. This bit should be set by the IP HW or FW and should trigger an interrupt to the Verifier. The verifier is expected to use this bit as a trigger to update the data region into the flash identified by this instance of verifier register. The Verifier address and size provides the address and size of the data blob. This bit is not in dashboard 1.0 |
| 16 | RWO | 1'h0 | Firmware push or pull completed: Optional bits one for each of the four FW instances. These bits should be set by the IP or the verifier when the FW load process is complete. These bits should be connected to an Interrupt to either the IP, or the verifier based on the IP's FW load model. If the IP supports a push model, this bit should interrupt the IP indicating push is complete. If the IP supports a pull model, these bits could interrupt the verifier indicating pull is complete. |
| 15:4 | RO | 28'h0 | Reserved |
| 3:1 | RWO | 3'h0 | Reserved |
| 0:0 | RWO | 1'h0 | Verification Done: When this bit is set, Verifier will inform the IP (or equivalent HW logic or FW component) that the firmware corresponding to this dashboard register has successfully verified and resides at the physical memory address in bits 63:3. This bit along with the bits in the verifying error status register provide the status of the loading if verifying was triggered but not completed. IP's could further optimize the usage of this bit by connecting it to an interrupt towards the host or the IP's controller. |

TABLE 12

Loading Error Status Register

| Bits | Access Type | Default | Description |
|---|---|---|---|
| 31:20 | RO | 11'h0 | Reserved |
| 15:12 | RO | 1'h0 | Reserved |
| 11:8 | RO | 3'h0 | Reserved |
| 7:4 | RW | 4'h0 | Loading error code: 4 bits that could be used to exchange generic error codes. This error has to correspond to the failure bit set in bits 3:0 |

TABLE 12-continued

Loading Error Status Register

| Bits | Access Type | Default | Description |
|---|---|---|---|
| 3:0 | RW | 4'h0 | Loading failed: Loader is expected to set this bit on any failure. There are 4 bits allocated for each of the 4 images that could be loaded. IP's could further optimize the usage of this bit by connecting it to an interrupt towards the host or the IP's controller. |

TABLE 13

Verification Error Status Register

| Bits | Access Type | Default | Description |
|---|---|---|---|
| 31:20 | RO | 11'h0 | Reserved |
| 15:12 | RO | 1'h0 | Reserved |
| 11:8 | RO | 3'h0 | Reserved |
| 7:4 | RW | 4'h0 | Verifying error code: 4 bits that could be used to exchange generic error codes. This error must correspond to the failure bit set in bits 3:0 |
| 3:0 | RW | 4'h0 | Verifying failed: Verifier is expected to set this bit on any failure. There are 4 bits allocated for each of the 4 images that could be loaded. IP's could further optimize the usage of this bit by connecting it to an interrupt towards the host or the IP's controller. |

TABLE 14

Interrupt Mask Register

| Bits | Access Type | Default | Description |
|---|---|---|---|
| 31:28 | RO | 3'h0 | Reserved |
| 27:24 | RW | 4'h1 | Interrupt enable bit for IP data region update request. One bit is allocated for each FW instance. By default all interrupts are masked at reset. |
| 23:20 | RW | 4'h1 | Interrupt enable bit for IP data region update done. One bit is allocated for each FW instance. By default all interrupts are masked at reset. |
| 19:16 | RW | 4'h1 | Interrupt enable bit for IP push or pull complete. One bit is allocated for each FW instance. By default all interrupts are masked at reset. |
| 15:12 | RW | 4'h1 | Interrupt enable bit for Verification done. One bit is allocated for each FW instance. By default all interrupts are masked at reset. |
| 11:8 | RW | 4'h1 | Interrupt enable bit for Verifier load complete bit. One bit is allocated for each FW instance. By default all interrupts are masked at reset. |
| 7:4 | RW | 4'h1 | Interrupt enable bit for FW loading done. One bit is allocated for each FW instance. By default all interrupts are masked at reset. |
| 3:0 | RW | 4'h1 | Interrupt enable bit for IP ready for FW load. One bit is allocated for each FW instance. By default all interrupts are masked at reset. |

TABLE 15

Interrupt Status Clear Register
(A write to this register bit will clear the corresponding interrupt.)

| Bits | Access Type | Default | Description |
|---|---|---|---|
| 31:28 | RO | 3'h0 | Reserved |
| 27:24 | RWC | 4'h0 | Interrupt status bit for IP data region update request. One bit is allocated for each FW instance. |
| 23:20 | RWC | 4'h0 | Interrupt status bit for IP data region update done. One bit is allocated for each FW instance. |
| 19:16 | RWC | 4'h0 | Interrupt status bit for IP push or pull complete. One bit is allocated for each FW instance. |
| 15:12 | RWC | 4'h0 | Interrupt status bit for Verification done. One bit is allocated for each FW instance. |
| 11:8 | RWC | 4'h0 | Interrupt status bit for Verifier load complete bit. One bit is allocated for each FW instance. |
| 7:4 | RWC | 4'h0 | Interrupt status bit for FW loading done. One bit is allocated for each FW instance. |
| 3:0 | RWC | 4'h0 | Interrupt status bit for IP ready for FW load. One bit is allocated for each FW instance. |

Figure 3:
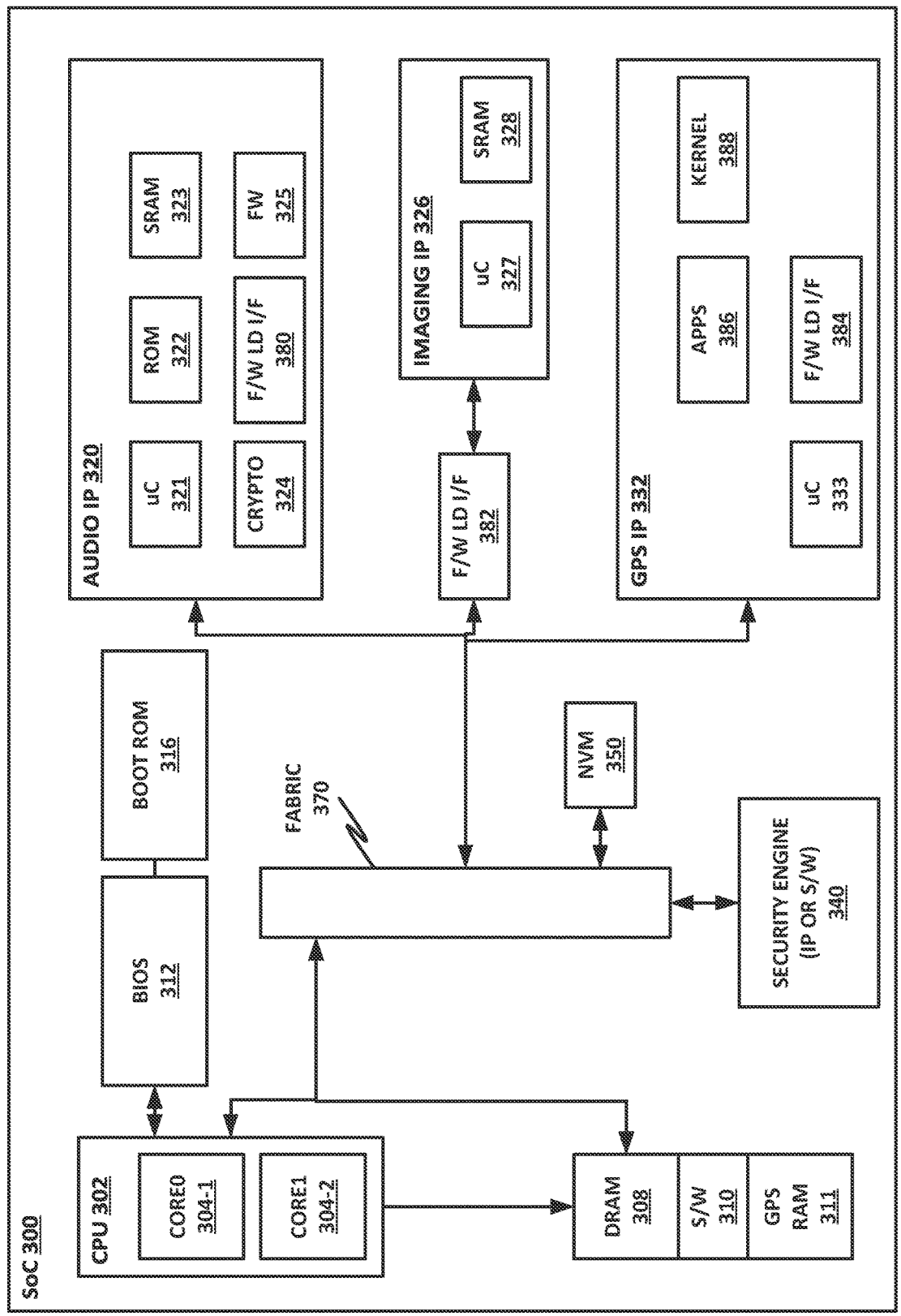
FIG. 3 illustrates an SoC that provides both single-stage and multi-stage loading of an intellectual property (IP) firmware.

FIG. 3 is a block diagram of an SoC 300, illustrating additional aspects of potential IPs. FIG. 3 in particular illustrates both single-stage loading and multi-stage loading of an IP firmware. SoC 300 is provided as an illustration of a platform that may use the teachings of the present specification. But it should be understood that SoC 300 is a nonlimiting and illustrative example only. Other systems, and in particular other integrated circuits, could successfully apply the teachings of the present specification.

SoC 300 in this example includes all three flavors of IP blocks discussed above.

SoC 300 includes a CPU 302 comprising two cores, core 0 304-1 and core 1 304-2. A multicore CPU is provided here by way of illustrative and nonlimiting example. In other embodiments, other numbers of cores may be provided, including a single core, or multiple cores such as 4 cores, 8 cores, 12 cores, 16 cores, 24 cores, 32 cores, 64 cores, 128 cores, or any other suitable number of cores. CPU 302 and/or cores 304 may include a number of registers, as discussed further below with regard to FIG. 3.

CPU 302 may be bootstrapped by a BIOS 312, which may load firmware from a boot ROM 316.

CPU 302 communicatively couples to a dynamic RAM 308, which may have running therein software 310, and may also have a copy of GPS RAM 311. GPS RAM 311 may be used for one of the IP blocks, particularly in this case GPS IP 332. GPS IP 332 includes microcontroller 333, firmware load interface 384, applications 386, and kernel 388. DRAM 308 may have copies of other information, data, and/or instructions. Data and instructions may in some cases be loaded from a different source, such as a storage or a nonvolatile memory 350.

SoC 300 includes a fabric 370 that is used to communicatively couple different portions of SoC 300 with one another. Fabric 370 could include, by way of nonlimiting example, a Northbridge, Southbridge, Intel® On-Chip System Fabric (IOSF), Intel® Uncore, Intel® Omni-Path Interconnect, or any other fabric, communication process, or buses that may be used to interconnect various pieces of SoC 300. It should be particularly noted that although SoC 300 shows certain interconnects between discrete devices and fabric 370, this is not to imply a necessary relationship between these interconnects. In various embodiments, any of the devices illustrated here may be interconnected in any suitable fashion.

SoC 300 includes a security engine 340, which may in various embodiments be an IP block, software, firmware, or any combination of the above. Security engine 340 may include, for example, a TEE, and may include instructions, microcode, software, firmware, or other processes that provide security. Security engine 340 may in particular be responsible for verifying the firmware loaded to the various IP blocks, including audio IP 320, imaging IP 326, and GPS IP 332.

The IP blocks disclosed herein, such as audio IP 320, imaging IP 326, and GPS IP 332 are IPs that may commonly be used in an SoC used for a mobile telephone, tablet, or similar device. However, it should be understood that these are disclosed by way of nonlimiting example only. SoC 300 could as easily be an SoC for a server blade in a data center, or an SoC for any other purpose.

IP blocks 320, 326, and 332 may in one example be "self-sufficient" IPs. These are IPs that are fully self-sufficient and have no external component dependency. In other words, as long as they are used in the design and given the appropriate inputs and outputs, they can fully function.

The firmware load flow for the various IP blocks may be provided in various different models. For example, a firmware load flow could be provided in a push model. In a push model, the IP expects an external controller to push the firmware into its RAM. For example, imaging IP 326 may expect CPU 302 to push the firmware image into SRAM 328.

In a pull model, an IP expects to pull its own firmware image into internal RAM. For example, audio IP 320 may employ a pull model for loading IP firmware. In this case, CPU 302 provides to audio IP 320 an address that audio IP 320 can access to pull the firmware image into SRAM 323 or ROM 322. A variant of the pull model is when the IP does not pull the firmware internally but executes the firmware from external memory. For example, GPS IP 332 in this illustration does not have an internal SRAM. GPS IP 332 may receive from CPU 302 an address, and GPS IP 332 may access that address from DRAM 308, and may execute its firmware from DRAM 308.

In this illustration, three IP blocks are disclosed for illustration purposes. Audio IP 320 includes a microcontroller 321. Audio IP 320 also includes a ROM 322, an SRAM 323, and an internal crypto module 324. Audio IP 320 is disclosed as an example of a "Flavor 1" IP. This IP has a ROM and built-in hardware crypto capabilities to establish its own root of trust. However, audio IP 320 still relies on an external agent such as an operating system running within DRAM 308, or a controller such as CPU 302, to copy the firmware to an SoC-addressable memory for it to load. Audio IP 320 may then access that memory via DMA, and verify the firmware image via crypto module 324. Audio IP 320 may then begin executing the loaded firmware.

Imaging IP 326 includes a microcontroller 327 and an SRAM 328. Microcontroller 327 may be different from microcontroller 321, and may have a different instruction set and architecture. Imaging IP 326 may have a completely different firmware load process from audio IP 320.

Imaging IP 326 is provided as an example of a "Flavor 2" IP. Imaging IP 326 has no ROM or hardware crypto module. Rather, imaging IP 326 purely depends on an external entity such as CPU 302 and security engine 340 to verify the integrity of its firmware. Imaging IP 326 also relies on an external entity such as CPU 302 to download the firmware image into SRAM 328 or a register file. Once the firmware image is verified and loaded into SRAM 328, imaging IP 326 can begin executing the firmware image.

GPS IP 332 has a microcontroller 333. Microcontroller 333 may be different from microcontroller 327 and microcontroller 321, including having a completely different instruction set and architecture. GPS IP 332 may have a different firmware load process from both imaging IP 326 and audio IP 320.

GPS IP 332 is provided as an example of a "Flavor 3" IP. GPS IP 332 has no internal ROM or crypto module. Rather, it expects an external agent such as CPU 302 and/or security engine 340 to verify the firmware image. It then expects an external agent such as CPU 302 to point it to the IP firmware image. For example, CPU 302 may provide to GPS IP 332 a pointer to GPS RAM 311 within DRAM 308. GPS IP 332 may then execute GPS RAM 311 directly from DRAM 308.

IP blocks 320, 326, and 332 are provided as three examples of different flavors of IP blocks. In practice, there may be any number of combinations that exist in the industry based on a number of factors. These factors may include, by way of illustrative and nonlimiting example:

1. Crypto capability internal and external to the IP.
2. IP designed with or without a ROM to establish a root of trust (ROT).
3. If the IP's controller executes from internal (to IP) RAM or from external RAM (e.g., RAM within the SoC).
4. If the IP can pull in firmware by itself, or requires some external agent to push the firmware into it.
5. If the SoC integrating the IP has a security controller that can be trusted with respect to the security requirements for the SoC's use case.
6. The number of stages of firmware for each IP. Some IPs load firmware only once. Other IPs load firmware multiple times in different stages of boot and operation.

In the case that SoC 300 also includes a trust requirement, if security engine 340 needs to play the role of verifier for imaging IP 326 and GPS IP 332, it will not have a flow that it can inherit from software 310. In this embodiment, the software architecture for SoC 300 must be defined at IP design time, and is not flexible at SoC integration time.

SoC 300 is different from SoC 200 in that SoC 300 specifically provides a number of firmware load interfaces, also known as firmware dashboards.

Specifically, audio IP 320 includes, internal to itself, firmware load interface 380. Imaging IP 326 is a legacy IP that does not include an integrated firmware dashboard. But the vendor of imaging IP 326 does provide a separate IP block, namely firmware load interface 382. Firmware load interface 382 provides a firmware dashboard external to imaging IP 326. Thus, by using firmware load interface 382 along with imaging IP 326, the result is equivalent to using an imaging IP with an internal firmware dashboard.

GPS IP 332 includes internal firmware load interface 384.

In SoC 100 of FIG. 1, if firmware dashboards are not provided for the IPs, then software running on main CPU 102 may need to implement three separate flows for each of the three disclosed IP blocks. There is no reusable flow among these three IPs.

However, in the case of SoC 300, a standardized firmware load flow can be provided. SoC 300 may have a specified trust requirement. If security engine 340 needs to play the role of verifier for imaging IP 326 and GPS IP 332, it may inherit a flow from software running on the host CPU. This inheritance may not be possible without the use of the firmware dashboards illustrated herein.

An embodiment of the firmware dashboard provided by firmware load interfaces 380, 382, and 384 extracts common elements of the firmware loading for each of the possible combinations, and creates a standard interface for software to load firmware into these IPs.

In this example, audio IP 320 may have a single-stage loading, while GPS IP 332 has a multi-stage loading.

More particularly, audio IP 320 includes firmware 325. In this example, audio IP 320 has a single firmware image. In the illustrated embodiment, firmware 325 is loaded in a single instance, one time at boot. Once firmware 325 has been loaded to audio IP 320, no additional loading is necessary.

In contrast, GPS IP 332 has a multi-stage loading feature. In this example, GPS IP 332 needs to load both kernel 388 and applications 386. Thus, GPS IP 332 requires multiple stages of loading.

Applications 386 and kernel 388 may be loaded by different agents at different stages of boot, or even after boot. For example, kernel 388 may be loaded at boot time, while applications 386 may be loaded after boot. Furthermore, security engine 340 may assign to kernel 388 and applications 386 different trust levels. Kernel 388 may be more trusted, while applications 386 may be less trusted.

Figure 4:
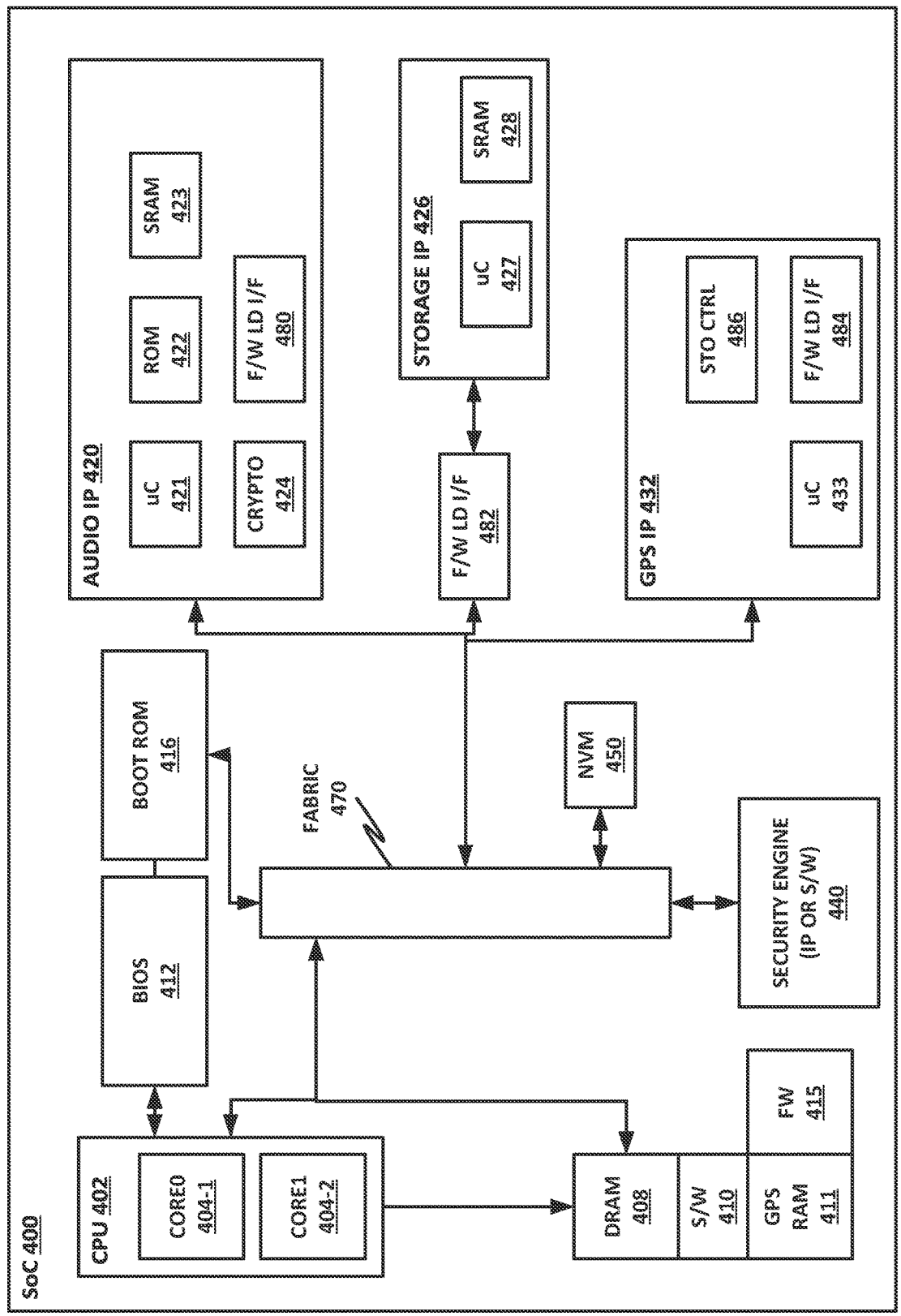
FIG. 4 illustrates an SoC that provides aspects of a firmware loader.

FIG. 4 is a block diagram of an SoC 400. SoC 400 illustrates aspects of a firmware loader. SoC 400 is provided as an illustration of a platform that may use the teachings of the present specification. But it should be understood that SoC 400 is a nonlimiting and illustrative example only. Other systems, and in particular other integrated circuits, could successfully apply the teachings of the present specification.

SoC 400 in this example includes all three flavors of IP blocks discussed above.

SoC 400 includes a CPU 402 comprising two cores, core 0 404-1 and core 1 404-2. A multicore CPU is provided here by way of illustrative and nonlimiting example. In other embodiments, other numbers of cores may be provided, including a single core, or multiple cores such as 4 cores, 8 cores, 12 cores, 16 cores, 24 cores, 32 cores, 64 cores, 128 cores, or any other suitable number of cores. CPU 402 and/or cores 404 may include a number of registers, as discussed further below with regard to FIG. 4.

CPU 402 may be bootstrapped by a BIOS 412, which may load firmware from a boot ROM 416.

CPU 402 communicatively couples to a dynamic RAM 408, which may have running therein software 410, and may also have a copy of GPS RAM 411. GPS RAM 411 may be used for one of the IP blocks, particularly in this case GPS IP 432. DRAM 408 may have copies of other information, data, and/or instructions. Data and instructions may in some cases be loaded from a different source, such as a storage or a nonvolatile memory 450.

SoC 400 includes a fabric 470 that is used to communicatively couple different portions of SoC 400 with one another. Fabric 470 could include, by way of nonlimiting example, a Northbridge, Southbridge, Intel® On-Chip System Fabric (IOSF), Intel® Uncore, Intel® Omni-Path Interconnect, or any other fabric, communication process, or buses that may be used to interconnect various pieces of SoC 400. It should be particularly noted that although SoC 400 shows certain interconnects between discrete devices and fabric 470, this is not to imply a necessary relationship between these interconnects. In various embodiments, any of the devices illustrated here may be interconnected in any suitable fashion.

SoC 400 includes a security engine 440, which may in various embodiments be an IP block, software, firmware, or any combination of the above. Security engine 440 may include, for example, a TEE, and may include instructions, microcode, software, firmware, or other processes that provide security. Security engine 440 may in particular be responsible for verifying the firmware loaded to the various IP blocks, including audio IP 420, storage IP 426, and GPS IP 432.

The IP blocks disclosed herein, such as audio IP 420, storage IP 426, and GPS IP 432 are IPs that may commonly be used in an SoC used for a mobile telephone, tablet, or similar device. However, it should be understood that these are disclosed by way of nonlimiting example only. SoC 400 could as easily be an SoC for a server blade in a data center, or an SoC for any other purpose.

IP blocks 420, 426, and 432 may in one example be "self-sufficient" IPs. These are IPs that are fully self-sufficient and have no external component dependency. In other words, as long as they are used in the design and given the appropriate inputs and outputs, they can fully function.

The firmware load flow for the various IP blocks may be provided in various different models. For example, a firmware load flow could be provided in a push model. In a push model, the IP expects an external controller to push the firmware into its RAM. For example, storage IP 426 may expect CPU 402 to push the firmware image into SRAM 428.

In a pull model, an IP expects to pull its own firmware image into internal RAM. For example, audio IP 420 may employ a pull model for loading IP firmware. In this case, CPU 402 provides to audio IP 420 an address that audio IP 420 can access to pull the firmware image into SRAM 423 or ROM 422. A variant of the pull model is when the IP does not pull the firmware internally but executes the firmware from external memory. For example, GPS IP 432 in this illustration does not have an internal SRAM. GPS IP 432 may receive from CPU 402 an address, and GPS IP 432 may access that address from DRAM 408, and may execute its firmware from DRAM 408.

In this illustration, three IP blocks are disclosed for illustration purposes. Audio IP 420 includes a microcontroller 421. Audio IP 420 also includes a ROM 422, an SRAM 423, and an internal crypto module 424. Audio IP 420 is disclosed as an example of a "Flavor 1" IP. This IP has a ROM and built-in hardware crypto capabilities to establish its own root of trust. However, audio IP 420 still relies on an external agent such as an operating system running within DRAM 408, or a controller such as CPU 402, to copy the firmware to an SoC-addressable memory for it to load. Audio IP 420 may then access that memory via DMA, and verify the firmware image via crypto module 424. Audio IP 420 may then begin executing the loaded firmware.

Storage IP 426 performs storage management functions to NVM 450 and includes a microcontroller 427 and an SRAM 428. Microcontroller 427 may be different from microcontroller 421, and may have a different instruction set and architecture. Storage IP 426 may have a completely different firmware load process from audio IP 420.

Storage IP 426 is provided as an example of a "Flavor 2" IP. Storage IP 426 has no ROM or hardware crypto module. Rather, storage IP 426 purely depends on an external entity such as CPU 402 and security engine 440 to verify the integrity of its firmware. Storage IP 426 also relies on an external entity such as CPU 402 to download the firmware image into SRAM 428 or a register file. Once the firmware image is verified and loaded into SRAM 428, storage IP 426 can begin executing the firmware image.

GPS IP 432 has a microcontroller 433. Microcontroller 433 may be different from microcontroller 427 and microcontroller 421, including having a completely different instruction set and architecture. GPS IP 432 may have a different firmware load process from both storage IP 426 and audio IP 420.

GPS IP 432 is provided as an example of a "Flavor 3" IP. GPS IP 432 has no internal ROM or crypto module. Rather, it expects an external agent such as CPU 402 and/or security engine 440 to verify the firmware image. It then expects an external agent such as CPU 402 to point it to the IP firmware image. For example, CPU 402 may provide to GPS IP 432 a pointer to GPS RAM 411 within DRAM 408. GPS IP 432 may then execute GPS RAM 411 directly from DRAM 408.

IP blocks 420, 426, and 432 are provided as three examples of different flavors of IP blocks. In practice, there may be any number of combinations that exist in the industry based on a number of factors. These factors may include, by way of illustrative and nonlimiting example:
1. Crypto capability internal and external to the IP.
2. IP designed with or without a ROM to establish a root of trust (ROT).
3. If the IP's controller executes from internal (to IP) RAM or from external RAM (e.g., RAM within the SoC).
4. If the IP can pull in firmware by itself, or requires some external agent to push the firmware into it.
5. If the SoC integrating the IP has a security controller that can be trusted with respect to the security requirements for the SoC's use case.
6. The number of stages of firmware for each IP. Some IPs load firmware only once. Other IPs load firmware multiple times in different stages of boot and operation.

In the case that SoC 400 also includes a trust requirement, if security engine 440 needs to play the role of verifier for storage IP 426 and GPS IP 432, it will not have a flow that it can inherit from software 410. In this embodiment, the software architecture for SoC 400 must be defined at IP design time, and is not flexible at SoC integration time.

SoC 400 is different from SoC 100 in that SoC 400 specifically provides a number of firmware load interfaces, also known as firmware dashboards.

Specifically, audio IP 420 includes, internal to itself, firmware load interface 480. Storage IP 426 is a legacy IP that does not include an integrated firmware dashboard. But the vendor of storage IP 426 does provide a separate IP block, namely firmware load interface 482. Firmware load interface 482 provides a firmware dashboard external to storage IP 426. Thus, by using firmware load interface 482 along with storage IP 426, the result is equivalent to using an imaging IP with an internal firmware dashboard.

GPS IP 432 includes internal firmware load interface 484.

In SoC 100 of FIG. 1, if firmware dashboards are not provided for the IPs, then software running on main CPU 102 may need to implement three separate flows for each of the three disclosed IP blocks. There is no reusable flow among these three IPs.

However, in the case of SoC 400, a standardized firmware load flow can be provided. SoC 400 may have a specified trust requirement. If security engine 440 needs to play the role of verifier for storage IP 426 and GPS IP 432, it may inherit a flow from software running on the host CPU. This inheritance may not be possible without the use of the firmware dashboards illustrated herein.

An embodiment of the firmware dashboard provided by firmware load interfaces 480, 482, and 484 extracts common elements of the firmware loading for each of the possible combinations, and creates a standard interface for software to load firmware into these IPs.

An IP loader is an agent responsible for loading the IP firmware image from external storage, flash, disc, NVM, or some other location. Note that the firmware loader may not necessarily authenticate the firmware, but is simply responsible for loading it. Authentication may be separately performed, for example by security engine 440.

A firmware image 415 may be located in DRAM 408. In this example, firmware 415 may not have any security properties assigned by DRAM 408 or CPU 402.

Storage IP 426 may DMA into DRAM 408. Storage IP 426 may use its microcontroller 427 and its internal storage SRAM 428 to copy firmware image 415 from DRAM 408. Storage IP 426 can then boot from the firmware image.

In the case of GPS IP 432, a storage controller 486 is provided. A firmware 415 may similarly be provided in DRAM 408 for GPS IP 432. Firmware 415 retrieves GPS RAM 411 from DRAM 408. Because GPS IP 432 does not have an SRAM or ROM, it executes GPS RAM 411 directly from DRAM 408.

On boot, microcontroller 433 of GPS IP 432 operates storage controller 486 to retrieve firmware image 415 from DRAM 408. In this example, GPS IP 432 does not have an internal ROM or firmware ROM or SRAM, so firmware 415 is executed directly from DRAM 408.

In some examples, a ring 0 operating system storage driver or BIOS copying facility may be used to copy a firmware image into DDR from a nonvolatile memory or some other location.

Figure 5:
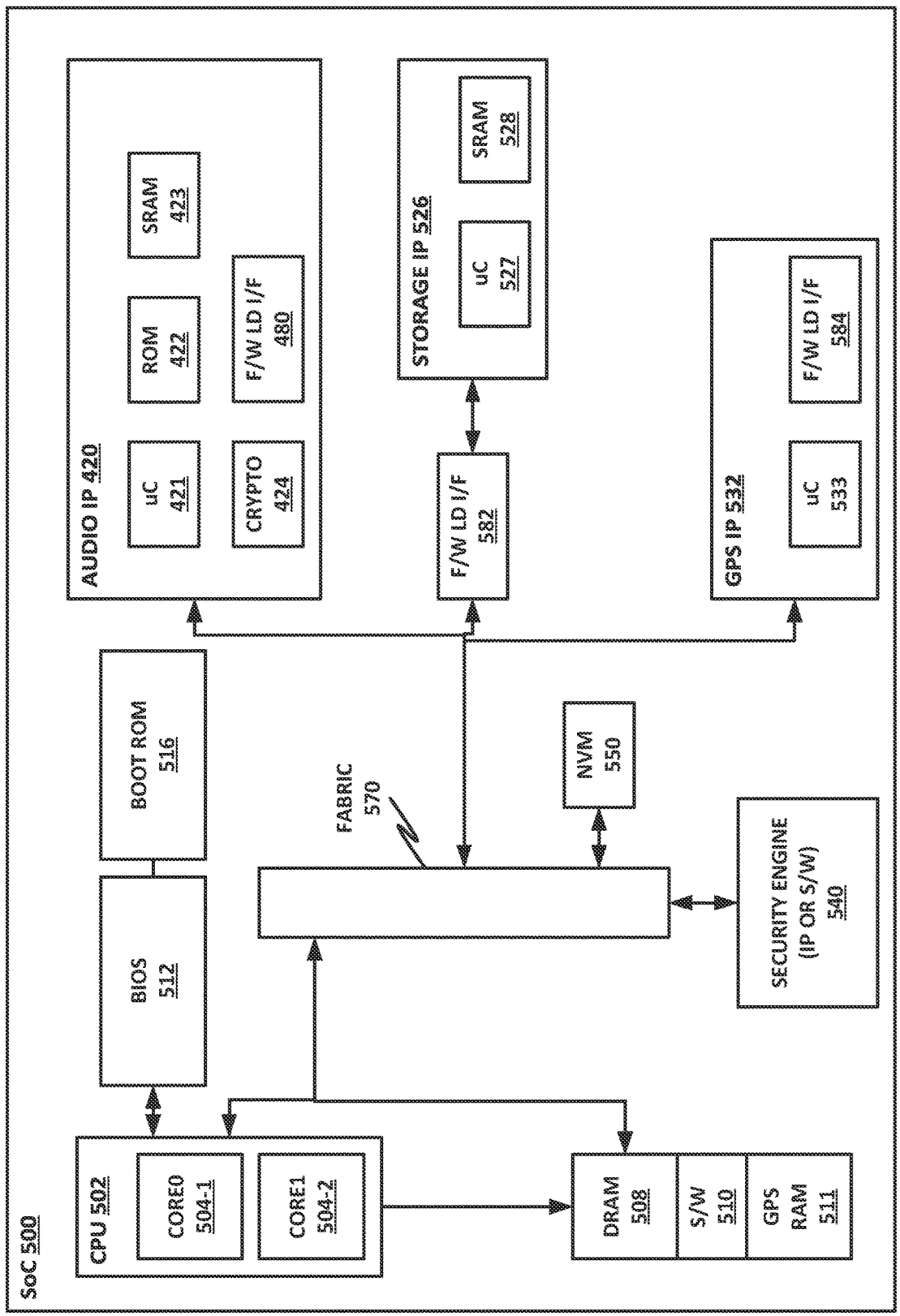
FIG. 5 illustrates an SoC that provides aspects of a firmware verifier.

FIG. 5 is a block diagram of an SoC 500. FIG. 5 illustrates aspects of a firmware verifier. SoC 500 is provided as an illustration of a platform that may use the teachings of the present specification. But it should be understood that SoC 500 is a nonlimiting and illustrative example only. Other systems, and in particular other integrated circuits, could successfully apply the teachings of the present specification.

SoC 500 in this example includes all three flavors of IP blocks discussed above.

SoC 500 includes a CPU 502 comprising two cores, core 0 504-1 and core 1 504-2. A multicore CPU is provided here by way of illustrative and nonlimiting example. In other embodiments, other numbers of cores may be provided, including a single core, or multiple cores such as 4 cores, 8 cores, 12 cores, 16 cores, 24 cores, 32 cores, 64 cores, 128 cores, or any other suitable number of cores. CPU 502 and/or cores 504 may include a number of registers, as discussed further below with regard to FIG. 5.

CPU 502 may be bootstrapped by a BIOS 512, which may load firmware from a boot ROM 516.

CPU 502 communicatively couples to a dynamic RAM 508, which may have running therein software 510, and may also have a copy of GPS RAM 511. GPS RAM 511 may be used for one of the IP blocks, particularly in this case GPS IP 532. DRAM 508 may have copies of other information, data, and/or instructions. Data and instructions may in some cases be loaded from a different source, such as a storage or a nonvolatile memory 550.

SoC 500 includes a fabric 570 that is used to communicatively couple different portions of SoC 500 with one another. Fabric 570 could include, by way of nonlimiting example, a Northbridge, Southbridge, Intel® On-Chip System Fabric (IOSF), Intel® Uncore, Intel® Omni-Path Interconnect, or any other fabric, communication process, or buses that may be used to interconnect various pieces of SoC 500. It should be particularly noted that although SoC 500 shows certain interconnects between discrete devices and fabric 570, this is not to imply a necessary relationship between these interconnects. In various embodiments, any of the devices illustrated here may be interconnected in any suitable fashion.

SoC 500 includes a security engine 540, which may in various embodiments be an IP block, software, firmware, or any combination of the above. Security engine 540 may include, for example, a TEE, and may include instructions, microcode, software, firmware, or other processes that provide security. Security engine 540 may in particular be responsible for verifying the firmware loaded to the various IP blocks, including audio IP 520, storage IP 526, and GPS IP 532.

The IP blocks disclosed herein, such as audio IP 520, storage IP 526, and GPS IP 532 are IPs that may commonly be used in an SoC used for a mobile telephone, tablet, or similar device. However, it should be understood that these are disclosed by way of nonlimiting example only. SoC 500 could as easily be an SoC for a server blade in a data center, or an SoC for any other purpose.

IP blocks 520, 526, and 532 may in one example be "self-sufficient" IPs. These are IPs that are fully self-sufficient and have no external component dependency. In other words, as long as they are used in the design and given the appropriate inputs and outputs, they can fully function.

The firmware load flow for the various IP blocks may be provided in various different models. For example, a firmware load flow could be provided in a push model. In a push model, the IP expects an external controller to push the firmware into its RAM. For example, storage IP 526 may expect CPU 502 to push the firmware image into SRAM 528.

In a pull model, an IP expects to pull its own firmware image into internal RAM. For example, audio IP 520 may employ a pull model for loading IP firmware. In this case, CPU 502 provides to audio IP 520 an address that audio IP 520 can access to pull the firmware image into SRAM 523 or ROM 522. A variant of the pull model is when the IP does not pull the firmware internally but executes the firmware from external memory. For example, GPS IP 532 in this illustration does not have an internal SRAM. GPS IP 532 may receive from CPU 502 an address, and GPS IP 532 may access that address from DRAM 508, and may execute its firmware from DRAM 508.

In this illustration, three IP blocks are disclosed for illustration purposes. Audio IP 520 includes a microcontroller 521. Audio IP 520 also includes a ROM 522, an SRAM 523, and an internal crypto module 524. Audio IP 520 is disclosed as an example of a "Flavor 1" IP. This IP has a ROM and built-in hardware crypto capabilities to establish its own root of trust. However, audio IP 520 still relies on an external agent such as an operating system running within DRAM 508, or a controller such as CPU 502, to copy the firmware to an SoC-addressable memory for it to load. Audio IP 520 may then access that memory via DMA, and verify the firmware image via crypto module 524. Audio IP 520 may then begin executing the loaded firmware.

Storage IP 526 performs storage management functions to NVM 550 and includes a microcontroller 527 and an SRAM 528. Microcontroller 527 may be different from microcontroller 521, and may have a different instruction set and architecture. Storage IP 526 may have a completely different firmware load process from audio IP 520.

Storage IP 526 is provided as an example of a "Flavor 2" IP. Storage IP 526 has no ROM or hardware crypto module. Rather, storage IP 526 purely depends on an external entity such as CPU 502 and security engine 540 to verify the integrity of its firmware. Storage IP 526 also relies on an external entity such as CPU 502 to download the firmware image into SRAM 528 or a register file. Once the firmware image is verified and loaded into SRAM 528, storage IP 526 can begin executing the firmware image.

GPS IP 532 has a microcontroller 533. Microcontroller 533 may be different from microcontroller 527 and microcontroller 521, including having a completely different instruction set and architecture. GPS IP 532 may have a different firmware load process from both storage IP 526 and audio IP 520. GPS IP 532 is provided as an example of a "Flavor 3" IP. GPS IP 532 has no internal ROM or crypto module. Rather, it expects an external agent such as CPU 502 and/or security engine 540 to verify the firmware image. It then expects an external agent such as CPU 502 to point it to the IP firmware image. For example, CPU 502 may provide to GPS IP 532 a pointer to GPS RAM 511 within DRAM 508. GPS IP 532 may then execute GPS RAM 511 directly from DRAM 508.

IP blocks 520, 526, and 532 are provided as three examples of different flavors of IP blocks. In practice, there may be any number of combinations that exist in the industry based on a number of factors. These factors may include, by way of illustrative and nonlimiting example:

1. Crypto capability internal and external to the IP.
2. IP designed with or without a ROM to establish a root of trust (ROT).
3. If the IP's controller executes from internal (to IP) RAM or from external RAM (e.g., RAM within the SoC).
4. If the IP can pull in firmware by itself, or requires some external agent to push the firmware into it.
5. If the SoC integrating the IP has a security controller that can be trusted with respect to the security requirements for the SoC's use case.
6. The number of stages of firmware for each IP. Some IPs load firmware only once. Other IPs load firmware multiple times in different stages of boot and operation.

In the case that SoC 500 also includes a trust requirement, if security engine 540 needs to play the role of verifier for storage IP 526 and GPS IP 532, it will not have a flow that it can inherit from software 510. In this embodiment, the software architecture for SoC 500 must be defined at IP design time, and is not flexible at SoC integration time.

SoC 500 is different from SoC 100 in that SoC 500 specifically provides a number of firmware load interfaces, also known as firmware dashboards.

Specifically, audio IP 520 includes, internal to itself, firmware load interface 580. Storage IP 526 is a legacy IP that does not include an integrated firmware dashboard. But the vendor of storage IP 526 does provide a separate IP block, namely firmware load interface 582. Firmware load interface 582 provides a firmware dashboard external to storage IP 526. Thus, by using firmware load interface 582 along with storage IP 526, the result is equivalent to using an imaging IP with an internal firmware dashboard.

GPS IP 532 includes internal firmware load interface 584.

In SoC 100 of FIG. 1, if firmware dashboards are not provided for the IPs, then software running on main CPU 102 may need to implement three separate flows for each of the three disclosed IP blocks. There is no reusable flow among these three IPs.

However, in the case of SoC 500, a standardized firmware load flow can be provided. SoC 500 may have a specified trust requirement. If security engine 540 needs to play the role of verifier for storage IP 526 and GPS IP 532, it may inherit a flow from software running on the host CPU. This inheritance may not be possible without the use of the firmware dashboards illustrated herein.

A firmware image 515 may be located in DRAM 508. In this example, firmware 515 may not have any security properties assigned by DRAM 508 or CPU 502.

Storage IP 526 may DMA into DRAM 508. Storage IP 526 may use its microcontroller 527 and its internal storage SRAM 528 to copy firmware image 515 from DRAM 508. Storage IP 526 can then boot from the firmware image.

In the case of GPS IP 532, a storage controller 586 is provided. A firmware 515 may similarly be provided in DRAM 508 for GPS IP 532. Firmware 515 retrieves GPS RAM 511 from DRAM 508. Because GPS IP 532 does not have an SRAM or ROM, it executes GPS RAM 511 directly from DRAM 508.

On boot, microcontroller 533 of GPS IP 532 operates storage controller 586 to retrieve firmware image 515 from DRAM 508. In this example, GPS IP 532 does not have an internal ROM or firmware ROM or SRAM, so firmware 515 is executed directly from DRAM 508.

In some examples, a ring 0 operating system storage driver or BIOS copying facility may be used to copy a firmware image into DDR from a nonvolatile memory or some other location.

The IP verifier is an agent responsible for authenticating the IP firmware image for an IP block. The IP verifier may have been established as a secure agent in the SoC with a chain of trust. In some embodiments, the IP verifier is able to ensure integrity of firmware after verification. Examples of verifiers include, by way of illustrative and nonlimiting example:

1. Intel® architecture virtualization technology (VT)-based TEE or BIOS.
2. OS drivers.
3. Security controller IPs.
4. Microcontrollers for self-sufficient IPs.

In this illustration, for example, both security engine 540 and crypto module 524 of audio IP 520 are able to act as a firmware verifier. Note that because imaging IP 526 and GPS IP 532 both lack an internal crypto capability, security engine 540 will be required to perform that function for both of those IP blocks.

Figure 6:
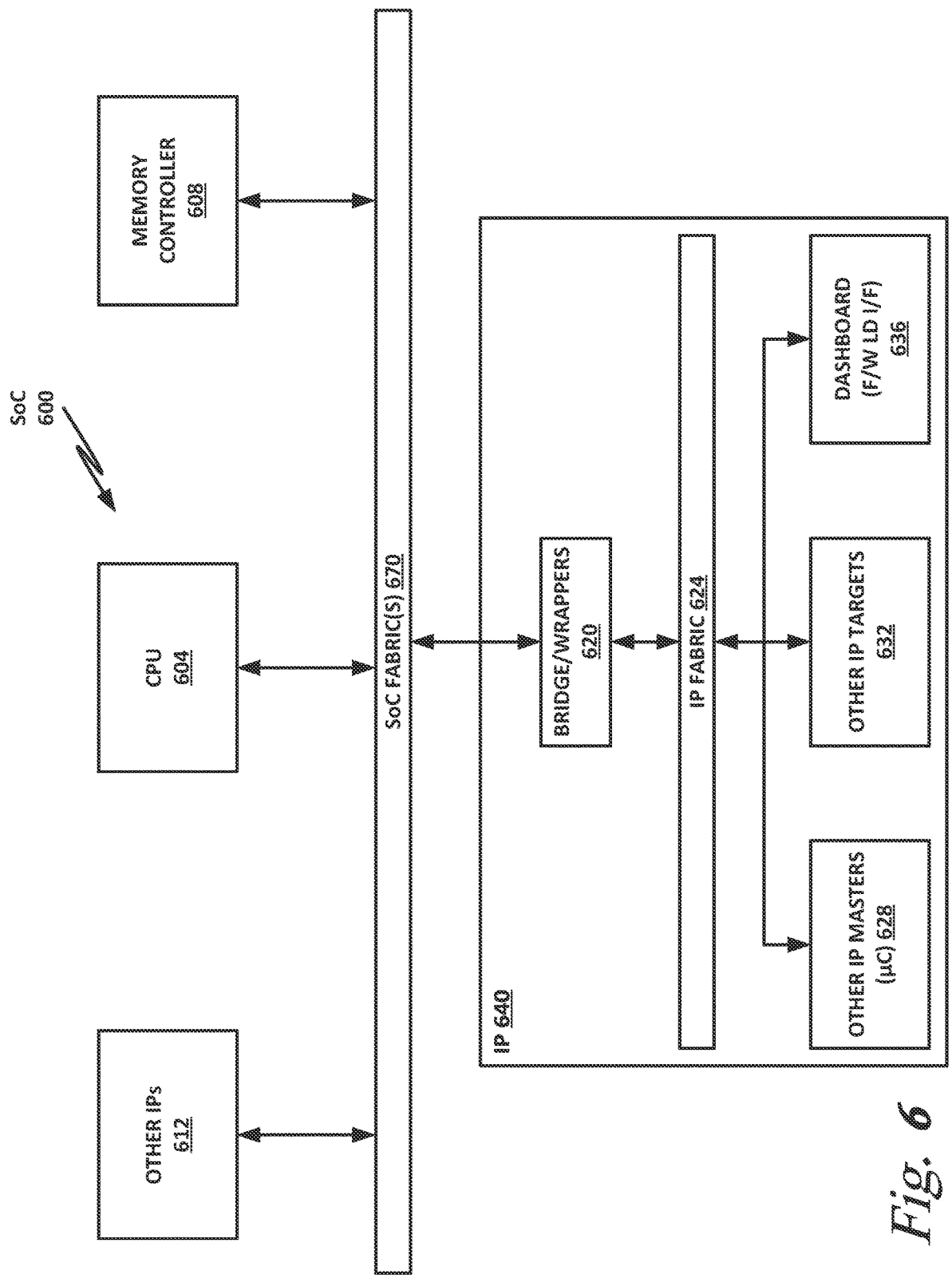
FIG. 6 is a block diagram of selected aspects of an SoC illustrating the use of a firmware dashboard.

FIG. 6 is a block diagram of selected aspects of an SoC 600 illustrating the use of a firmware dashboard, also known as a firmware load interface.

In this example, a CPU 604 and memory controller 608 communicatively couple to an SoC fabric or fabrics 670. Other IP blocks 612 are also provided.

IP 640 is shown in additional detail to illustrate aspects of the firmware dashboard.

In this embodiment, the firmware dashboard provides standardized register interfaces for loaders, verifiers, and inter-IP communication. The firmware dashboard 636 describes the IP capabilities and the IP configuration for SoC 600.

Firmware dashboard 636 also allows enumeration of IP 640, including information such as a flow for the IP firmware. Firmware dashboard 636 informs the verifier, such as a security engine, of the firmware location to verify. It also informs the IP where to and where from it may copy or execute firmware once the information is received from CPU 604. In some embodiments, it also provides standardized error definitions.

In this embodiment, firmware dashboard 636 includes a bridge and wrappers 620, that bridge functionality between CPU 604, memory controller 608, and other IPs 612 on the one hand, and IP 640 on the other. Firmware dashboard 636 communicatively couples to an IP fabric 624, which may be a fabric, interconnect, bus, or other circuitry or logic for interconnecting different parts of IP 640. IP fabric 624 communicatively couples to other IP masters (such as µController) 628, other IP target 632, and dashboard 636.

IP dashboard 636 supports multiple firmware images for IP 640. Furthermore, dashboard 636 may support any industry-standard fabrics, such as AXI, IOSF, and others, as necessary. It may also provide security protections.

In one example, dashboard 636 is memory-aligned in its own 4K range for page table-based protection. Dashboard may be accessible on MMIO and may be accessible via SoC fabric 670. To maintain standards compliance, dashboard 636 should not be implemented using any proprietary interfaces. Rather, industry-standard interfaces should be used to ensure that dashboard 636 performs its interfacing function.

In an embodiment, dashboard 636 resets on the deepest reset of IP block 640.

Table 16 below illustrates candidates to perform certain functions in an illustrative embodiment.

TABLE 16

| | | Proposed Candidate Functions | |
|---|---|---|---|
| Agent/Resource | Task/Action | Proposed Candidates | Security Expectation |
| IP | An integrated IP inside the SoC (Does not include discrete cards in the motherboard) | Audio/GPS/Imaging . . . | Needs to trust its own hardware/ROM and the verifier |
| Verifier | Verifies the firmware in memory and points the IP to the verified firmware/configuration | BIOS/VTL1/TZOS/Trusty . . . ROM | Needs to be as secure as the highest security workload handled by the IP (Integrity only) |
| Firmware Memory | Memory (DRAM or SRAM) where firmware is verified from | VT-d/VSM protected memory SAI protected memory (IMR) TZ firewall protected memory | Needs to be as secure as the highest security workload handled by the IP (Integrity only) |

Figure 7A:
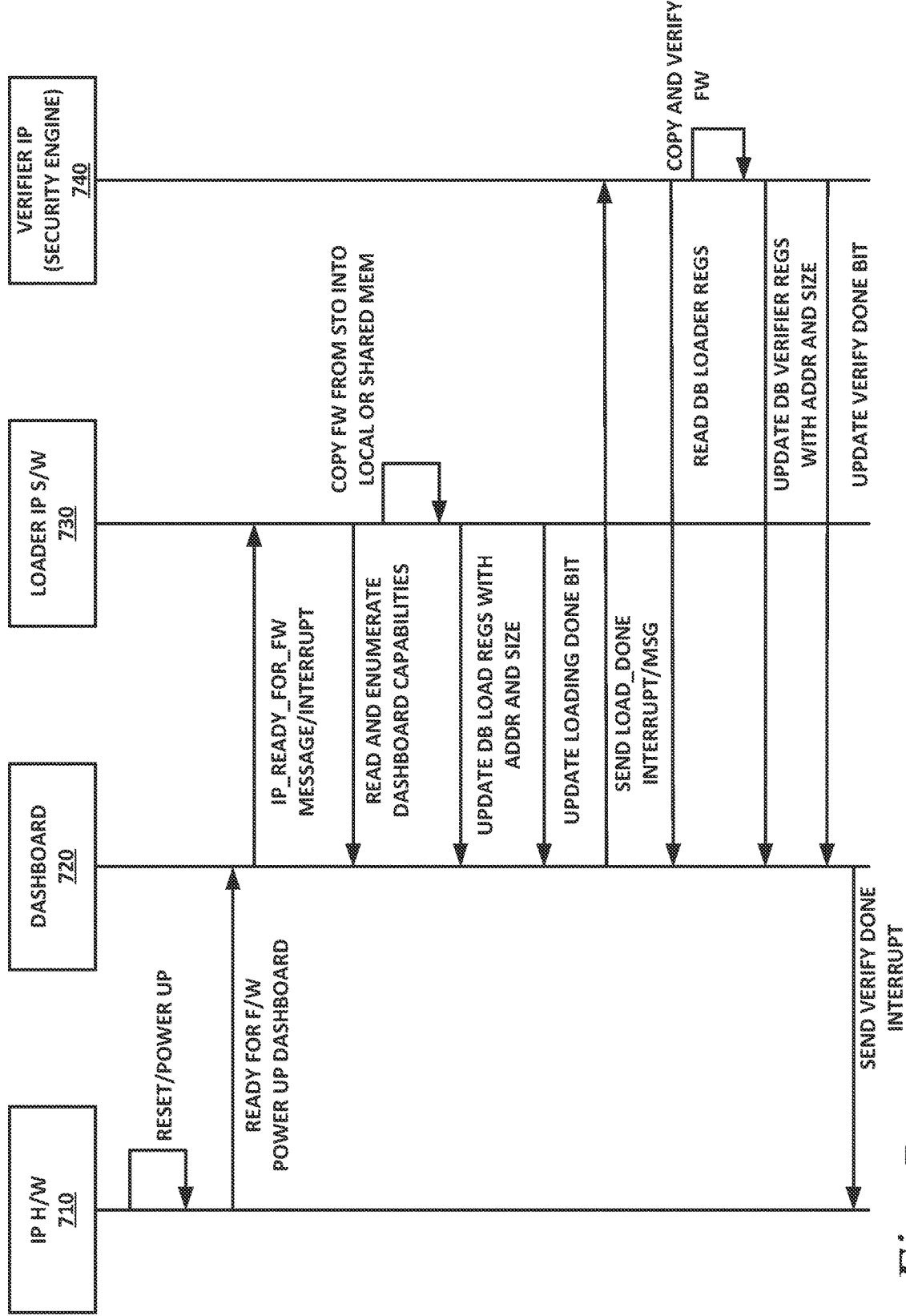
FIGS. 7a-7b illustrate an example signal flow.
Figure 7B:
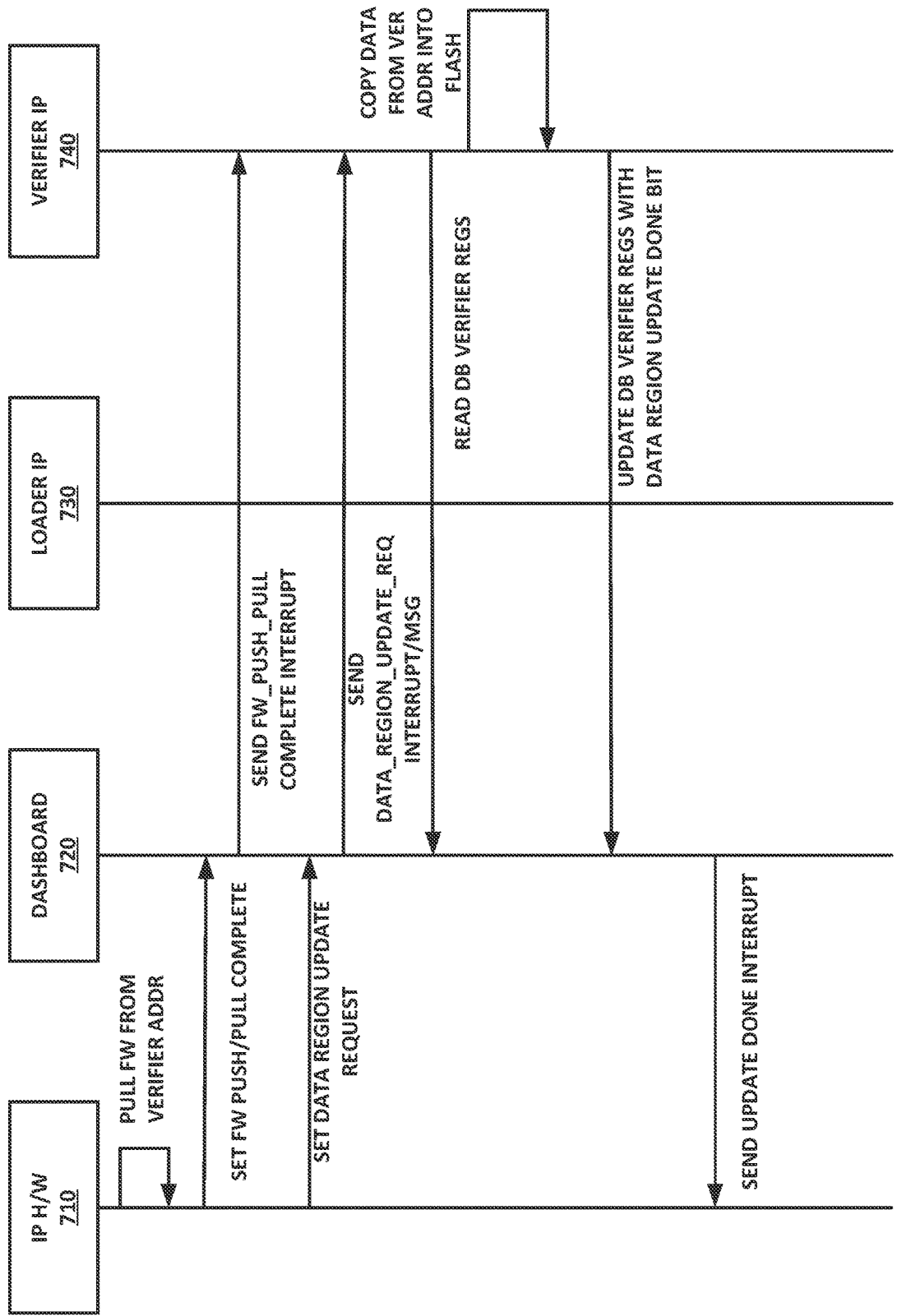
Figure 8A:
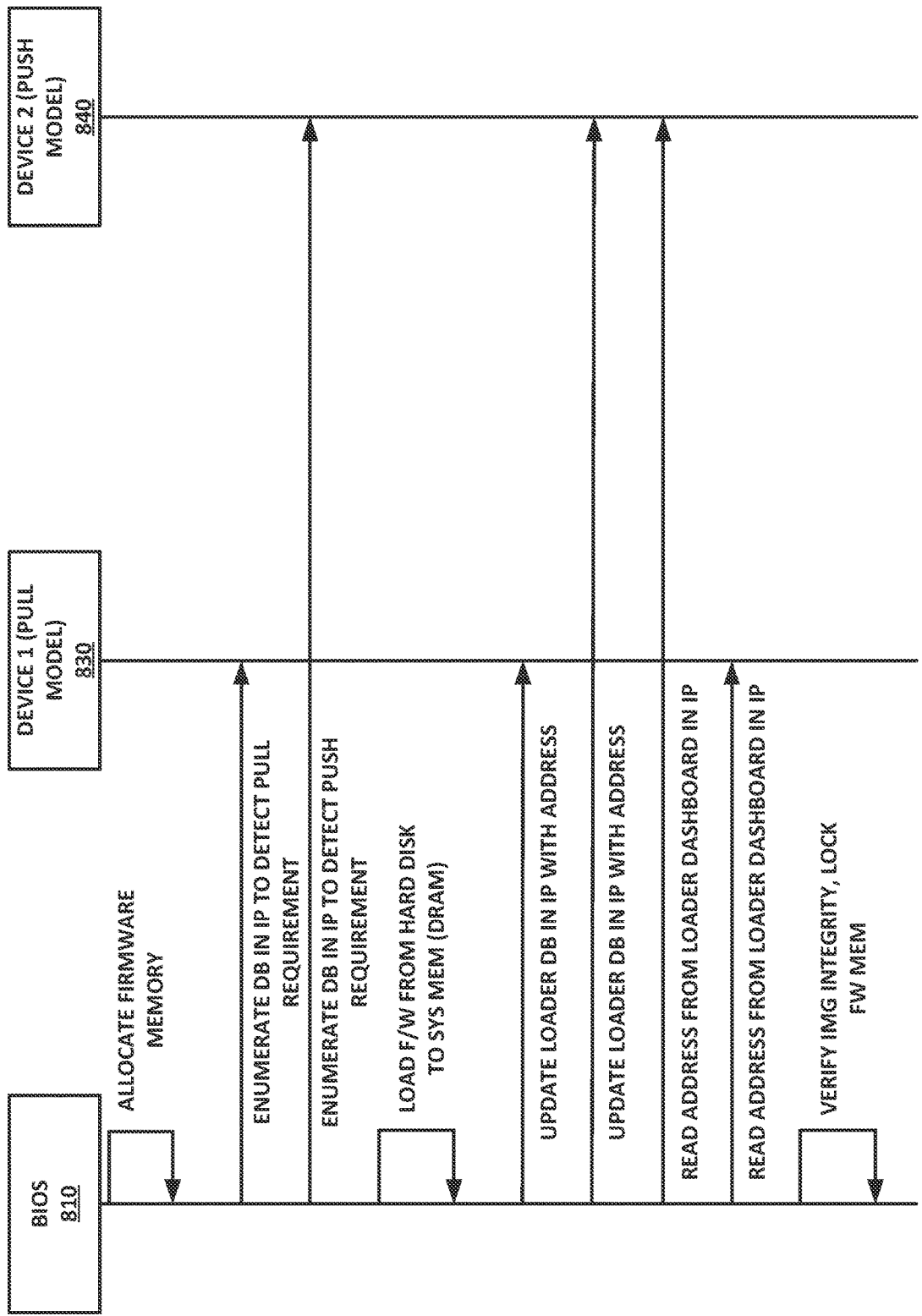
FIG. 8a illustrates a device with a pull model.
Figure 8B:
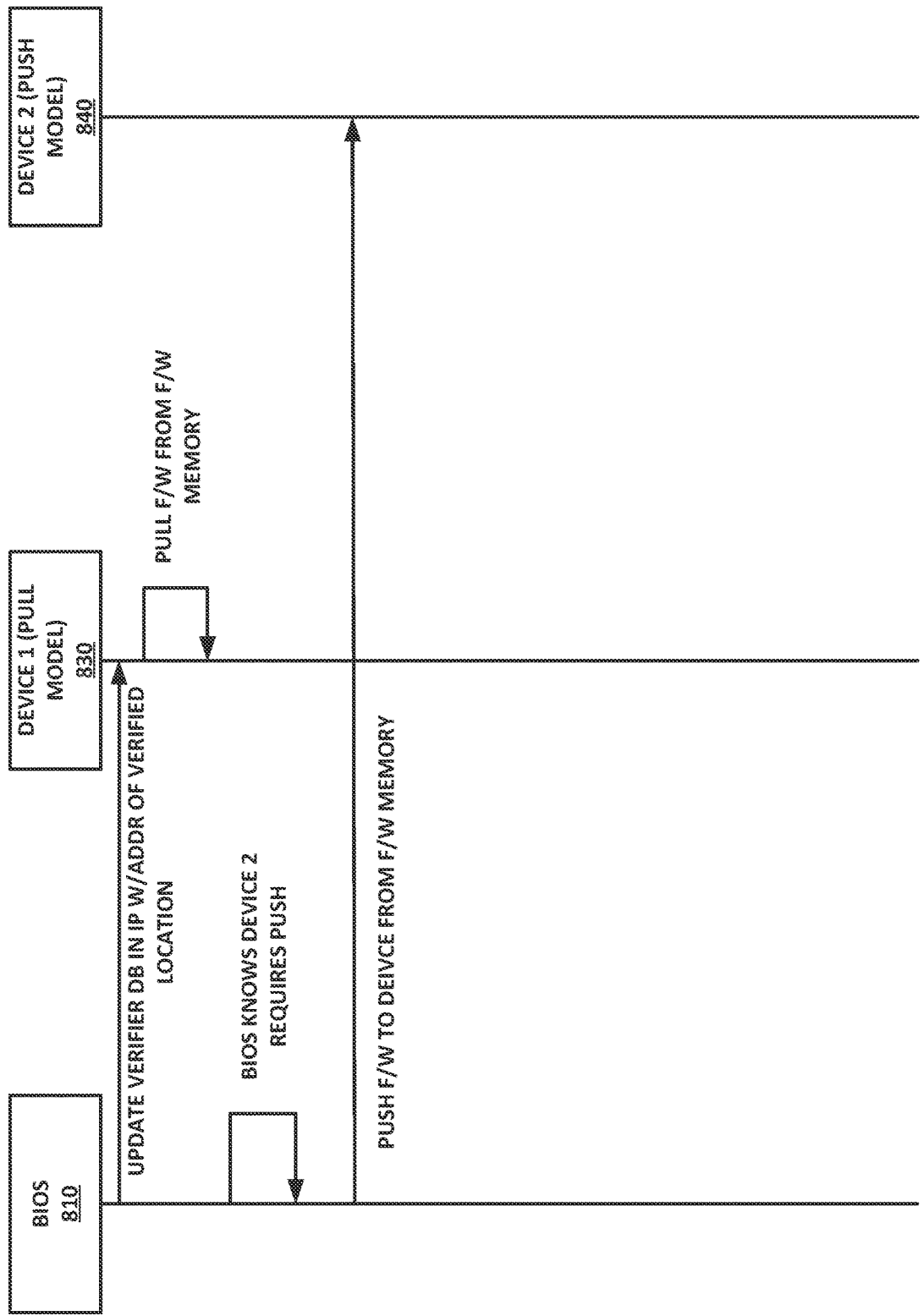
FIG. 8b illustrates a device with a push model.

FIGS. 7a, 7b, 8a, and 8b illustrate two illustrative flow procedures that may be carried out by a firmware dashboard executing on an SoC in embodiments of the present specification. FIGS. 7a and 7b illustrate an example where an external verifier IP, such as a security engine on the SoC, performs verification of the firmware. In the example of FIGS. 8a and 8b, there are illustrated aspects of a pull model and a push model on two different devices.

FIG. 7a illustrates a signal flow between an IP hardware 710, a dashboard 720, a loader IP software 730, and a verifier IP or security engine 740.

Initially, IP hardware 710 receives a reset or power-up event.

When IP hardware 710 is ready for firmware, it sends a signal to power up dashboard 720.

When dashboard 720 is powered, it sends a signal "ip_ready_for_firmware" message or interrupt to loader software 730. In response, loader software 730 reads and enumerates dashboard capabilities from dashboard 720. Once loader software 730 has enumerated the capabilities of dashboard 720, it copies the firmware from storage or NVM into a local or shared memory.

Loader software 730 then updates the dashboard load registers with the correct address and size for the firmware.

Next, loader 730 sends an update loading done bit to dashboard 720.

Dashboard 720 sends a "load_done" message or interrupt to verifier IP 740.

Verifier IP 740 reads the dashboard loader registers from dashboard 720. Verifier IP 740 then copies and verifies the firmware for IP hardware 710.

Verifier IP 740 updates the dashboard verifier registers with the correct address and size. Verifier IP 740 then sets the uptake verify done bit.

Dashboard 720 sends a "verify_done" interrupt to IP hardware 710.

Now that the firmware location has been identified and the firmware has been verified, turning to FIG. 7b, IP hardware 710 pulls the firmware from the verifier address provided.

IP hardware 710 sets the firmware push/pull complete bit for dashboard 720.

Dashboard 720 sends a firmware "fw_push_pull" complete interrupt indicating that the firmware push or pull is complete to verifier IP 740.

IP hardware 710 then sends a data region update request to dashboard 720. Dashboard 720 forwards the "data_region_update_req" message or interrupt to verifier IP 740.

Verifier IP 740 reads the dashboard verifier registers.

Verifier IP 740 then copies data from the verified address into flash.

Verifier IP 740 sends update dashboard verifier registers with data region update done bit to dashboard 720.

Dashboard 720 sends "update_done" interrupt to IP hardware 710.

IP hardware 710 can then boot from the provided firmware.

FIGS. 8a and 8b illustrate two devices, namely device 1 830 with a pull model, and device 2 840 with a push model, wherein BIOS 810 is configured to provide operating firmware to the devices.

Upon a reset or cold boot, BIOS 810 allocates for more memory.

For device 1 830, which has a pull model, BIOS 810 enumerates the dashboard in the IP to detect pull requirements.

For device 2 840, which has a push model, BIOS 810 enumerates the dashboard in the IP to detect push requirements.

BIOS 810 then loads firmware from the hard disk or NVM to system memory, such as DRAM.

For device 1 830, BIOS 810 updates the loader dashboard in the IP with the address of the allocated firmware.

For device 2 840, BIOS 810 updates the loader dashboard in the IP with the appropriate address for the firmware.

For device 2 840, BIOS 810 then reads the address from the loader dashboard in the IP. For device 1 830, BIOS 810 reads the address from the loader dashboard in the IP.

BIOS 810 may now verify the image integrity, and once the images are verified, it may lock the firmware memory for one or both images.

Turning to FIG. 8b, for device 1 830, BIOS 810 updates the verifier dashboard in the IP with the location of the verified firmware. Device 1 830 then pulls the firmware from the firmware memory and boots.

For device 2 840, which requires a push, BIOS 810 knows that device 2 requires the push. Thus, BIOS 810 pushes the firmware to device 2 840 from the firmware memory. Device 2 840 may then boot.

Figure 9:
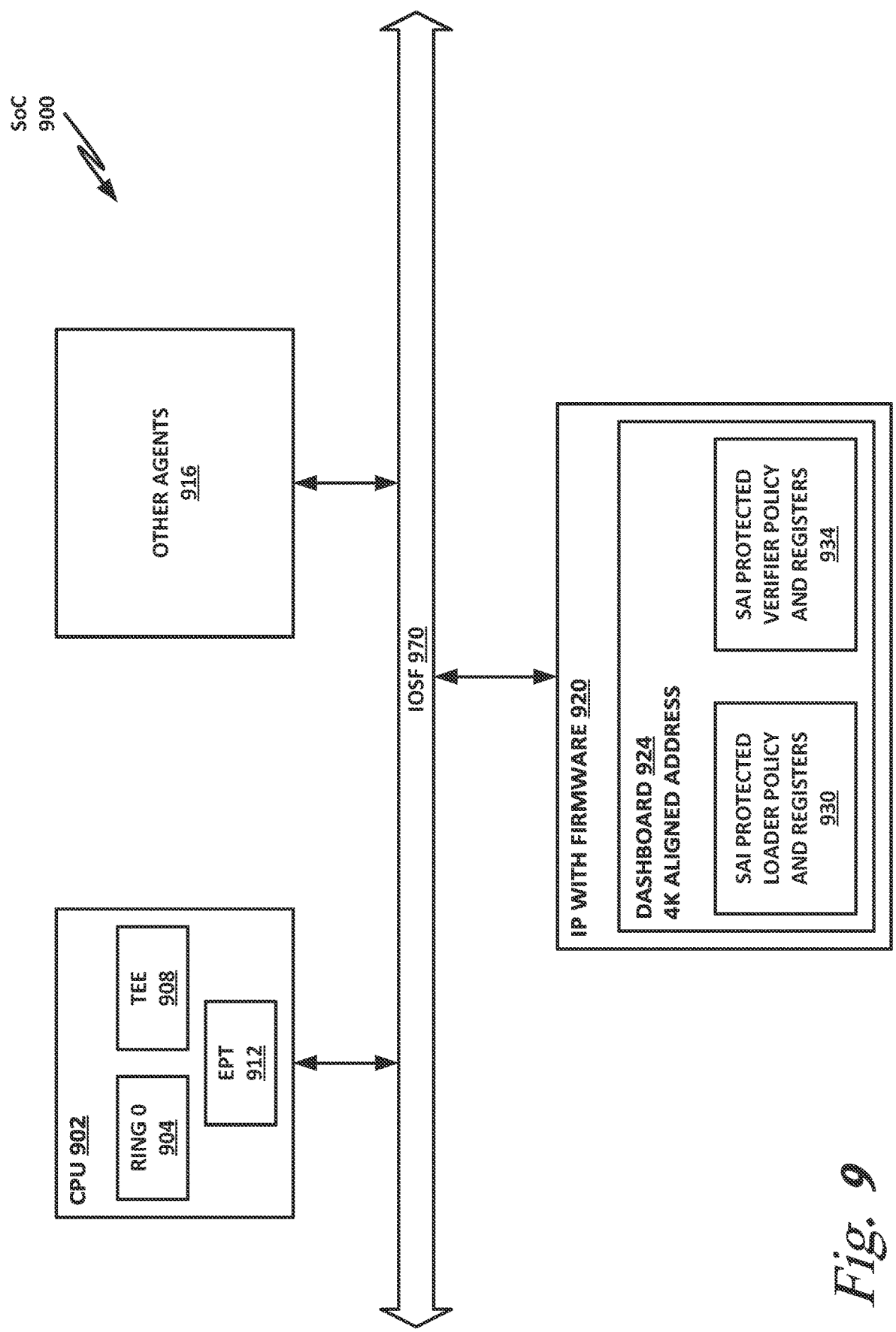
FIG. 9 is a block diagram of selected aspects of an SoC illustrating particular aspects of a firmware dashboard.

FIG. 9 is a block diagram of selected aspects of an SoC 900. SoC 900 illustrates particular aspects of a firmware dashboard.

In this example, a CPU 902 includes protection ring 0 904, a TEE 908, and an EPT 912. Other agents 916 are also provided. In this example, an IOSF fabric 970 is provided. IP 920 communicatively couples to IOSF. IP 920 includes a firmware 920.

IP 920 also includes a dashboard 924 with a 4K-aligned address. Dashboard 924 provides SAI protected loader policy and registers 930. Dashboard 924 also provides SAI protected verifier policy and registers 934.

Note that dashboard 924 may have no read protection. However, registers may be categorized into two different groups, namely a loader group and a verifier group, for write protection. Further note that dashboard registers are aligned to a 4K address boundary for page table-based protection.

FIG. 10 illustrates a dashboard base 1000 and a loader base 1010. In the embodiment of FIG. 10, loader base 1010 of dashboard base 1000 is provided to loader error status of loader base 1010.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

Figure 11A:
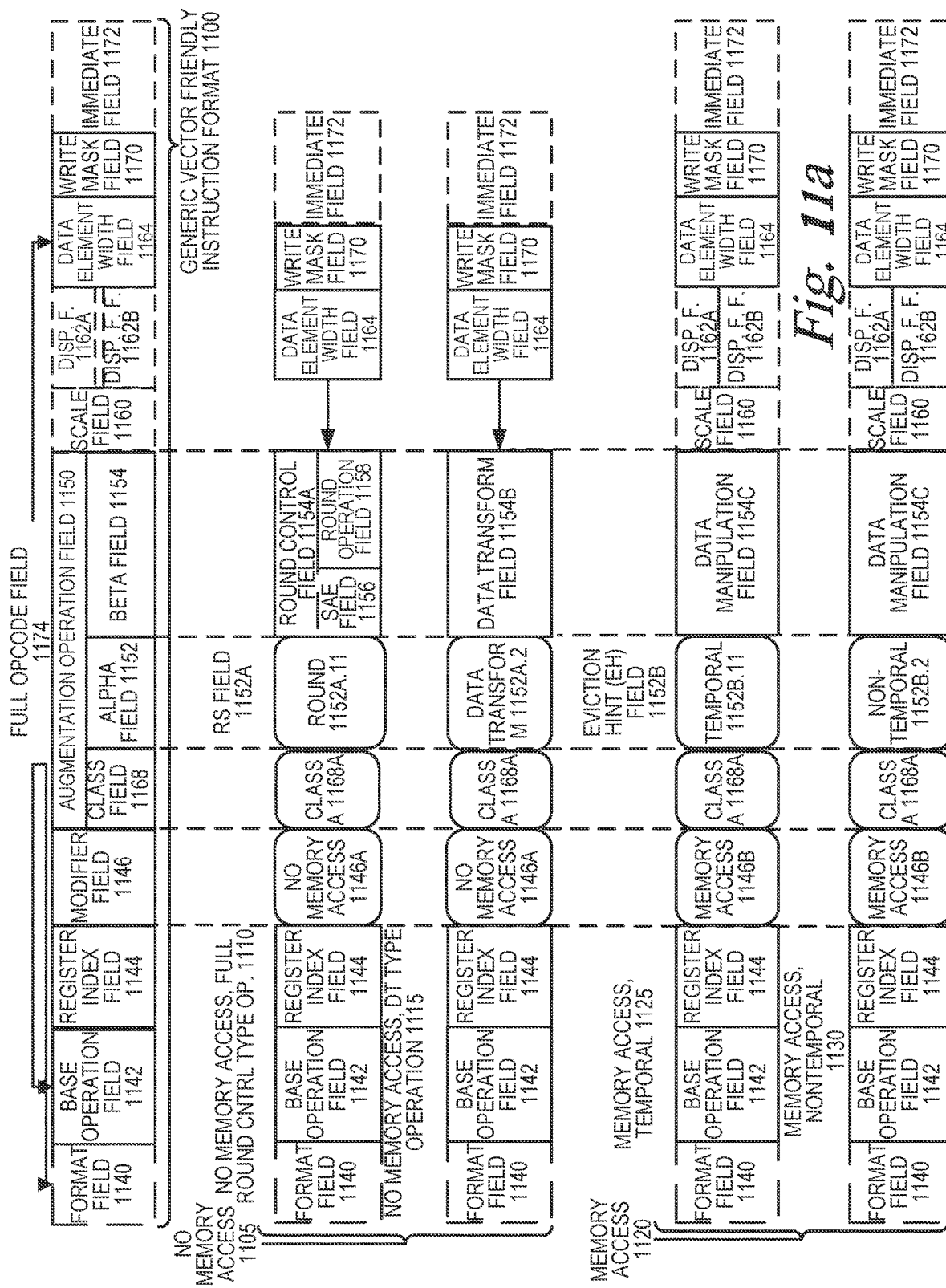

FIGS. 11a-11b are block diagrams illustrating a generic vector-friendly instruction format and instruction templates thereof, which may be configured to operate within the standardized interface for IP blocks disclosed in the present specification.

FIG. 11a is a block diagram illustrating a generic vector-friendly instruction format and class A instruction templates thereof according to embodiments of the specification; while FIG. 11b is a block diagram illustrating the generic vector-friendly instruction format and class B instruction templates thereof according to embodiments of the specification. Specifically, a generic vector-friendly instruction format 1100 for which are defined class A and class B instruction templates, both of which include no memory access 1105 instruction templates and memory access 1120 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 11a include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, nontemporal 1130 instruction template. The class B instruction templates in FIG. 11b include: 1) within the no memory access 1105 instruction templates there is shown a no memory access, write mask control, partial round control type operation 1112 instruction template and a no memory access, write mask control, VSIZE type operation 1117 instruction template; and 2) within the memory access 1120 instruction templates there is shown a memory access, write mask control 1127 instruction template.

The generic vector-friendly instruction format 1100 includes the following fields listed below in the order illustrated in FIGS. 11a-11b.

Format field 1140—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 1150—its content distinguishes which one of a variety of different operations to be performed in addition to the base operation. This field is context specific. In one embodiment of the specification, this field is divided into a class field 1168, an alpha field 1152, and a beta field 1154. The augmentation operation field 1150 allows common groups of operations to be performed in a single instruction rather than two, three, or four instructions.

Scale field 1160—its content allows for the scaling of the index field's content for memory address generation (e.g., for address generation that uses $2^{scale}$*index+base).

Displacement Field 1162A—its content is used as part of memory address generation (e.g., for address generation that uses $2^{scale}$*index+base+displacement).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the specification are described in which the write mask field's 1170 content selects one of a number of write mask registers that contains the write mask to be used (and thus the write mask field's 1170 content indirectly identifies that masking to be performed), alternative embodiments instead or additionally allow the mask write field's 1170 content to directly specify the masking to be performed.

Immediate field 1172—its content allows for the specification of an immediate. This field is optional in the sense that is it not present in an implementation of the generic vector-friendly format that does not support immediate and it is not present in instructions that do not use an immediate.

Class field 1168—its content distinguishes between different classes of instructions. With reference to FIGS. 11a-11b, the contents of this field select between class A and class B instructions. In FIGS. 11a- 11b, rounded corner squares are used to indicate a specific value is present in a field (e.g., class A 1168A and class B 1168B for the class field 1168 respectively in FIGS. 11a-11b).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed.

In the no memory access 1105 instruction templates, the scale field 1160, the displacement field 1162A, and the displacement scale filed 1162B are not present.

No Memory Access Instruction Templates—Full Round Control Type Operation

In the no memory access full round control type operation 1110 instruction template, the beta field 1154 is interpreted as a round control field 1154A, whose content provides static rounding. While in the described embodiments of the specification the round control field 1154A includes a suppress all floating point exceptions (SAE) field 1156 and a round operation control field 1158, alternative embodiments may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating point exception flag and does not raise any floating point exception handler.

Round operation control field 1158—its content distinguishes which one of a group of rounding operations to perform (e.g., round-up, round-down, round-towards-zero and round-to-nearest). Thus, the round operation control field 1158 allows for the changing of the rounding mode on a per instruction basis. In one embodiment of the specification where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11a, temporal 1152B.1 and nontemporal 1152B.2 are respectively specified for the memory access, temporal 1125 instruction template and the memory access, nontemporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale field 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating point exception flag and does not raise any floating point exception handler).

Round operation control field 1159A—just as round operation control field 1158, its content distinguishes which one of a group of rounding operations to perform (e.g., round-up, round-down, round-towards-zero and round-to-nearest). Thus, the round operation control field 1159A allows for the changing of the rounding mode on a per instruction basis. In one embodiment of the specification where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted by the vector length field 1159B. The memory access 1120 instruction templates include the scale field 1160, and optionally the displacement field 1162A or the displacement scale field 1162B.

With regard to the generic vector-friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 12a-12d are block diagrams illustrating an example specific vector-friendly instruction format, which may be configured to operate within the standardized interface for IP blocks disclosed in the present specification.

Figure 12A:
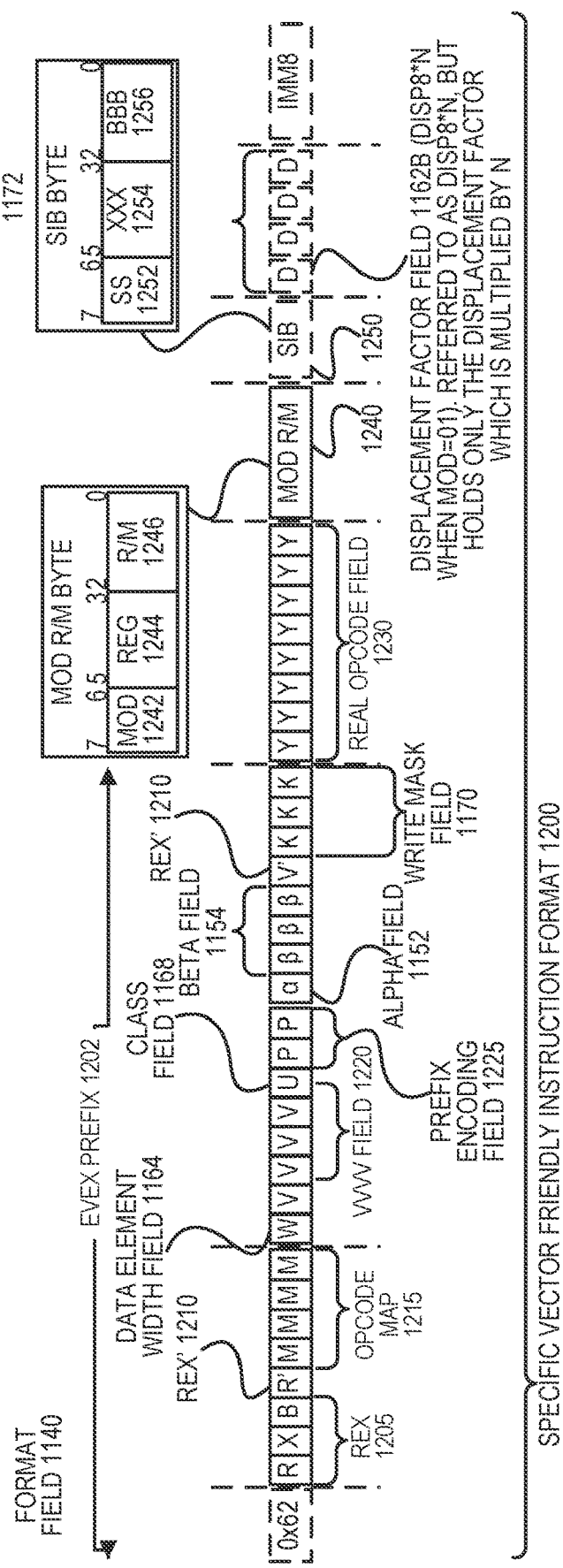
FIGS. 12a-12d are block diagrams illustrating an example specific vector-friendly instruction format according to one or more examples of the present specification.

FIG. 12a shows a specific vector-friendly instruction format 1200 that is specific in the sense that it specifies the location, size, interpretation, and order of the fields, as well as values for some of those fields. The specific vector-friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, Scale/Index/Base (SIB) field, displacement field, and immediate fields of the existing x86 instruction set with extensions. The fields from FIGS. 11a and 11b into which the fields from FIG. 12a map are illustrated.

It should be understood that, although embodiments of the specification are described with reference to the specific vector-friendly instruction format 1200 in the context of the generic vector-friendly instruction format 1100 for illustrative purposes, the present specification is not limited to the specific vector-friendly instruction format 1200 except where claimed. For example, the generic vector-friendly instruction format 1100 contemplates a variety of possible sizes for the various fields, while the specific vector-friendly instruction format 1200 is shown as having fields of specific sizes. By way of particular example, while the data element width field 1164 is illustrated as a one bit field in the specific vector-friendly instruction format 1200, the present specification is not so limited (that is, the generic vector-friendly instruction format 1100 contemplates other sizes of the data element width field 1164).

The generic vector-friendly instruction format 1100 includes the following fields listed below in the order illustrated in FIG. 12a.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0×62 (the unique value used for distinguishing the vector-friendly instruction format in one embodiment).

The second through fourth bytes (EVEX Bytes 1-3) include a number of bit fields providing specific capability.

REX field 1205 (EVEX Byte 1, bits [7-5])—consists of an EVEX.R bit field (EVEX Byte 1, bit [7]—R), EVEX.X bit field (EVEX byte 1, bit [6]—X), and 1157BEX byte 1, bit[5]—B). The EVEX.R, EVEX.X, and EVEX.B bit fields provide the same functionality as the corresponding VEX bit fields, and are encoded using 1s complement form, i.e. ZMM0is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0 F, 0 F 38, or 0 F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with two or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1220 encodes the four low-order bits of the first source register specifier stored in inverted (1s complement) form. Depending on the instruction, an extra different EVEX bit field is used to extend the specifier size to 32 registers.

EVEX.0 1168 Class field (EVEX byte 2, bit [2]-U)—if EVEX.U=0, it indicates class A or EVEX.U0; if EVEX.0=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only two bits). In one embodiment, to support legacy SSE instructions that use an SIMD prefix (66 H, F2 H, F3 H) in both the legacy format and in the EVEX prefix format, these legacy SIMD prefixes are encoded into the SIMD prefix encoding field; and at runtime are expanded into the legacy SIMD prefix prior to being provided to the decoder's programmable logic array (PLA) (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.eh, EVEX.rs, EVEX.rl, EVEX.write mask control, and EVEX.n; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real opcode field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

SIB Byte (Byte 6)—as previously described, the scale field's 1150 content is used for memory address generation. SIB.ss 1252, SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses eight bits that can be set to only four really useful values −128, −64, 0, and 64; since a greater range is often needed, disp32 is used; however, disp32 requires 4 bytes.

In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 1162B substitutes the legacy x86 instruction set 8-bit displacement.

Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

Figure 12B:
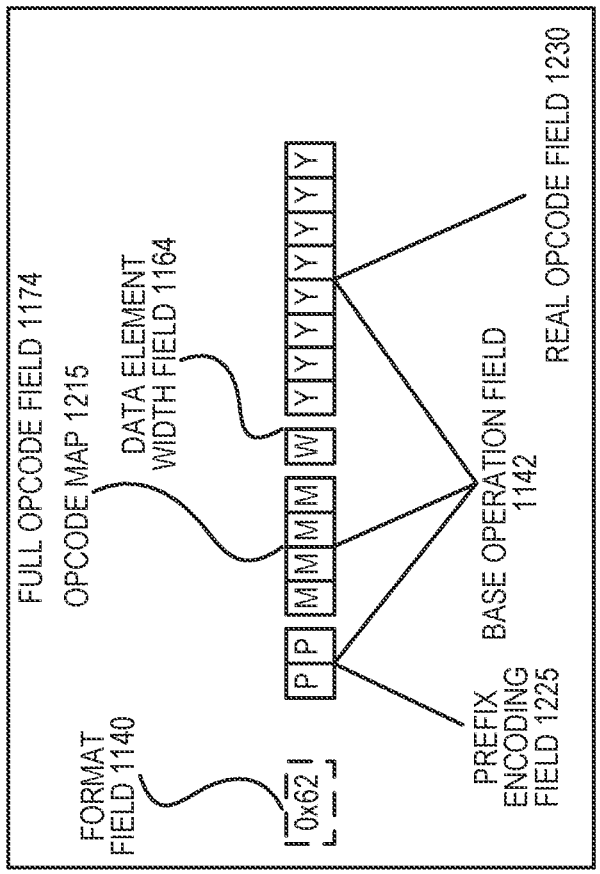

FIG. 12b is a block diagram illustrating the fields of the specific vector-friendly instruction format 1200 that make up the full opcode field 1174 according to one embodiment. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

Figure 12C:
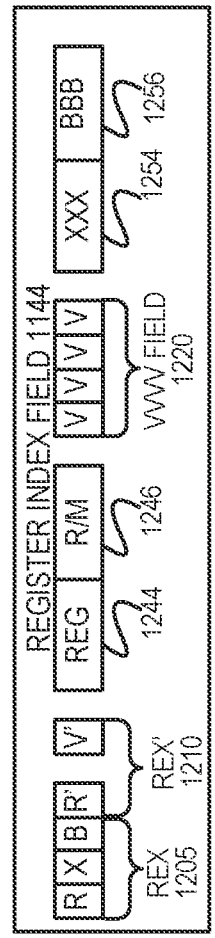

FIG. 12c is a block diagram illustrating the fields of the specific vector-friendly instruction format 1200 that make up the register index field 1144 according to one embodiment. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
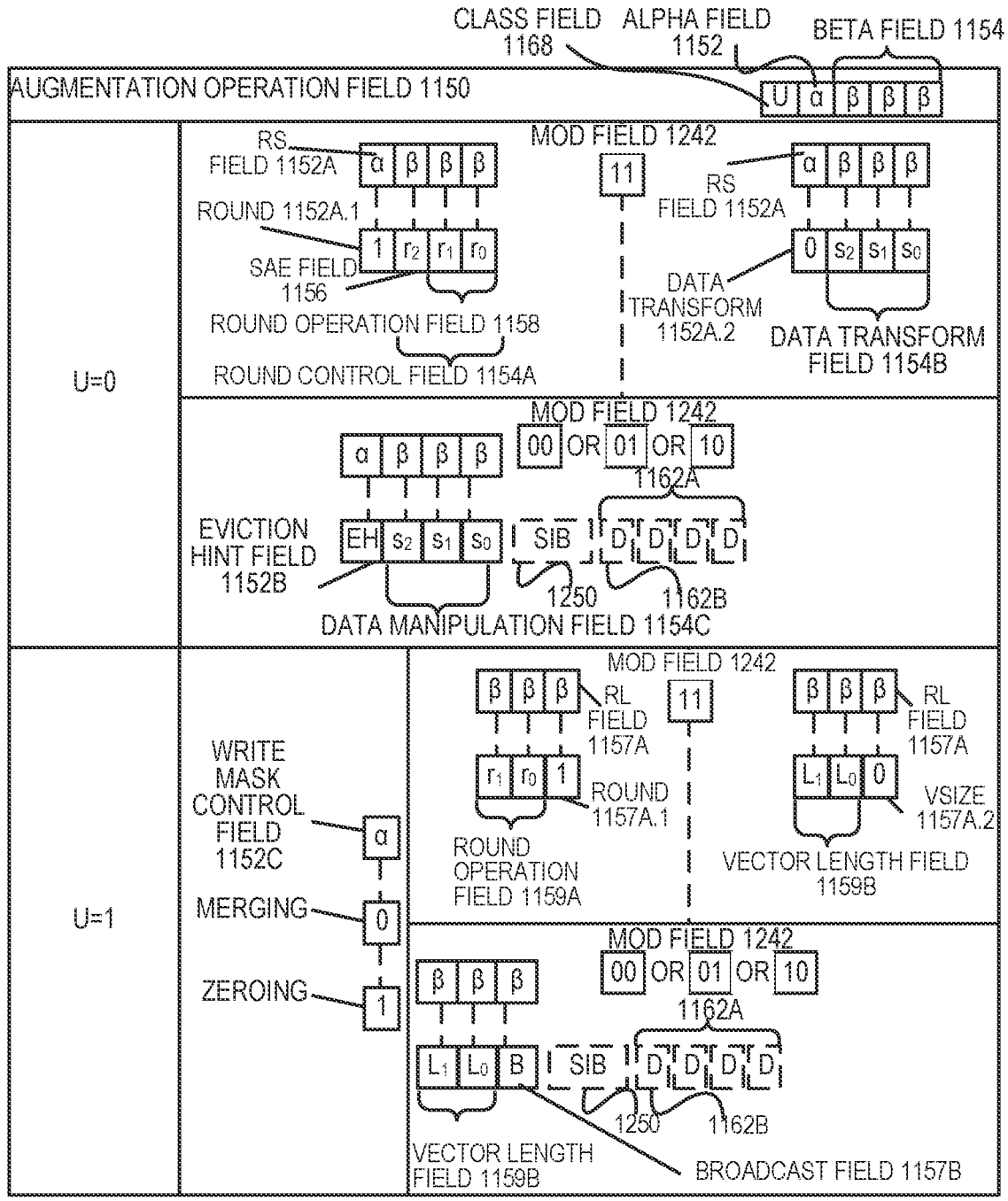

FIG. 12d is a block diagram illustrating the fields of the specific vector-friendly instruction format 1200 that make up the augmentation operation field 1150 according to one embodiment. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]—EH) is interpreted as the rs field 1152A. When the rs field 1152A contains a 1 (round 1152A.1), the beta field 1154 (EVEX byte 3, bits [6:4]—SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]—SSS) is interpreted as a three bit data transform field 1154B. When U=0 and the MOD field 1242 contains 00, 01, or 10 (signifying a memory access operation), the alpha field 1152 (EVEX byte 3, bit [7]—EH) is interpreted as the eviction hint (EH) field 1152B and the beta field 1154 (EVEX byte 3, bits [6:4]—SSS) is interpreted as a three bit data manipulation field 1154C.

When U=1, the alpha field 1152 (EVEX byte 3, bit [7]—EH) is interpreted as the write mask control (Z) field 1152C. When U=1 and the MOD field 1242 contains 11 (signifying a no memory access operation), part of the beta field 1154 (EVEX byte 3, bit [4]—$S_0$) is interpreted as the RL field 1157A; when it contains a 1 (round 1157A.1) the rest of the beta field 1154 (EVEX byte 3, bit [6-5]—$S_{2-1}$) is interpreted as the round operation field 1159A, while when the RL field 1157A contains a 0 (VSIZE 1157.A2) the rest of the beta field 1154 (EVEX byte 3, bit [6-5]—$S_{2-1}$) is interpreted as the vector length field 1159B (EVEX byte 3, bit [6-5]—$L_{1-0}$). When U=1 and the MOD field 1242 contains 00, 01, or 10 (signifying a memory access operation), the beta field 1154 (EVEX byte 3, bits [6:4]—SSS) is interpreted as the vector length field 1159B (EVEX byte 3, bit [6-5]—$L_{1-0}$) and the broadcast field 1157B (EVEX byte 3, bit [4]—B).

Example Register Architecture

Figure 13:
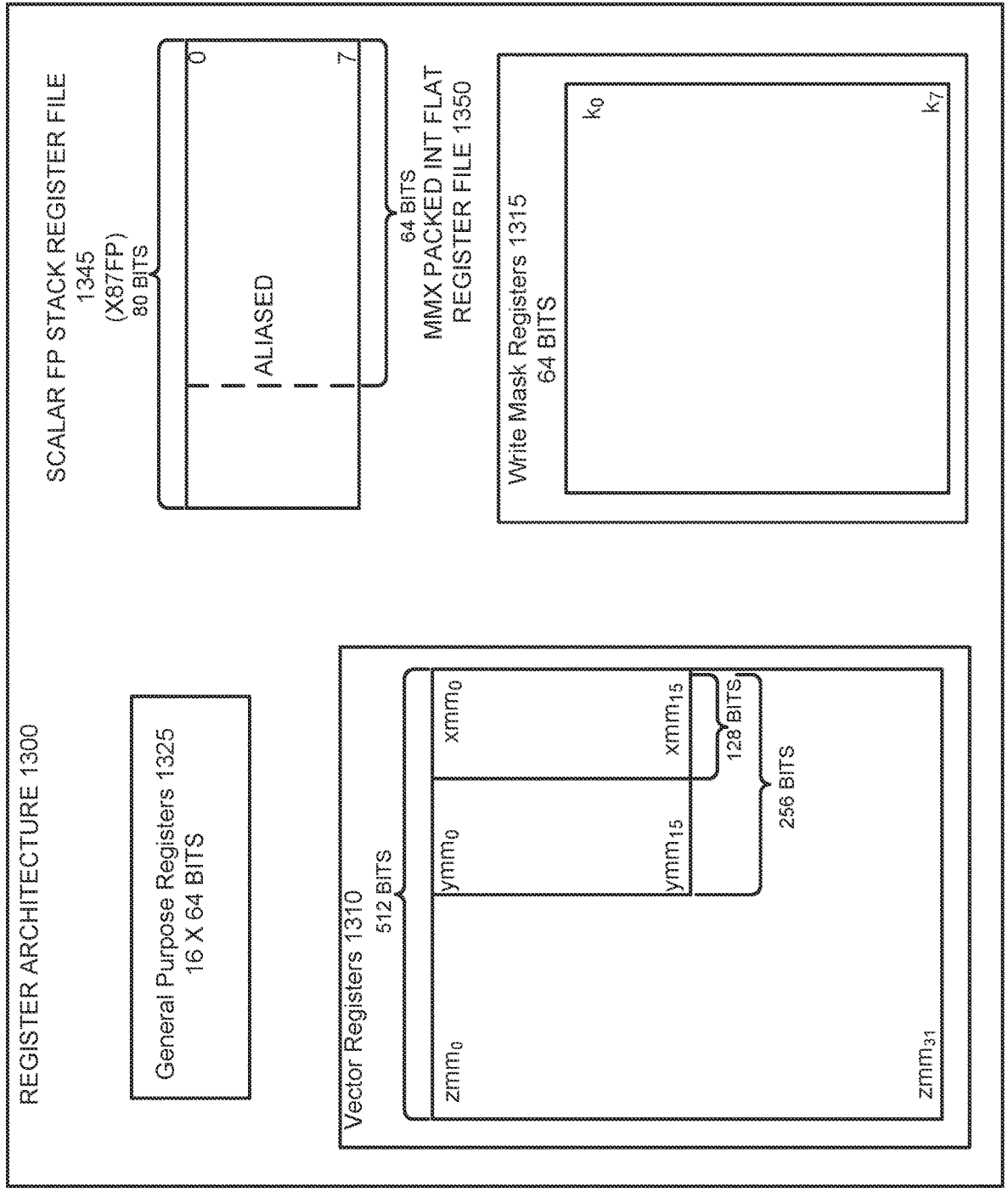
FIG. 13 is a block diagram of a register architecture according to one or more examples of the present specification.

FIG. 13 is a block diagram of a register architecture 1300, which may be configured to operate within the standardized interface for IP blocks disclosed in the present specification. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 1200 operates on these overlaid register files as illustrated in the below tables.

| Adjustable Vector Length | Class | Operations | Registers |
| --- | --- | --- | --- |
| Instruction Templates that do not include the vector length field 1159B | A (FIG. 11a; U = 0) | 1110, 1115, 1125, 1130 | zmm registers (the vector length is 64 byte) |
| | B (FIG. 11b; U = 1) | 1112 | zmm registers (the vector length is 64 byte) |
| Instruction templates that do include the vector length field 1159B | B (FIG. 11b; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instruction templates without the vector length field 1159B operate on the maximum vector length. Further, in one embodiment, the class B instruction templates of the specific vector-friendly instruction format 1200 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1315—in the embodiment illustrated, there are eight write mask registers (k0 through k7), each 64 bits in size. In an alternate embodiment, the write mask registers 1315 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General purpose registers 1325—in the embodiment illustrated, there are sixteen 64-bit general purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general purpose computing; 2) a high performance general purpose out-of-order core intended for general purpose computing; 3) a special-purpose core intended primarily for graphics and/or scientific (throughput) computing. Implementations of different processors may include: 1) a CPU including one or more general purpose in-order cores intended for general purpose computing and/or one or more general purpose out-of-order cores intended for general purpose computing; and 2) a coprocessor including one or more special-purpose cores intended primarily for graphics and/or scientific throughput.

Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special-purpose logic, such as integrated graphics and/or scientific (throughput) logic, or as special-purpose cores); and 4) an SoC that may include on the same die the described CPU (sometimes referred to as the application core(s) or application processor(s)), the above described coprocessor, and additional functionality.

Example core architectures are described next, followed by descriptions of example processors and computer architectures.

Example Core Architectures

In-Order and Out-of-Order Core Block Diagram

Figure 14A:
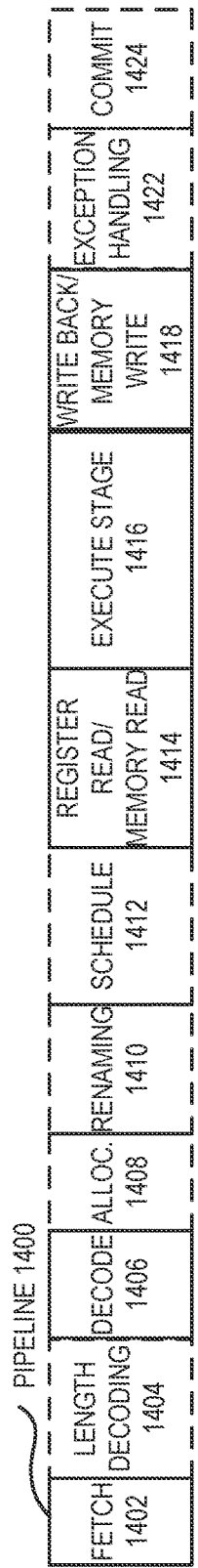
FIG. 14a is a block diagram illustrating both an example in-order pipeline and an example register renaming an out-of-order issue/execution pipeline according to one or more examples of the present specification.
Figure 14B:
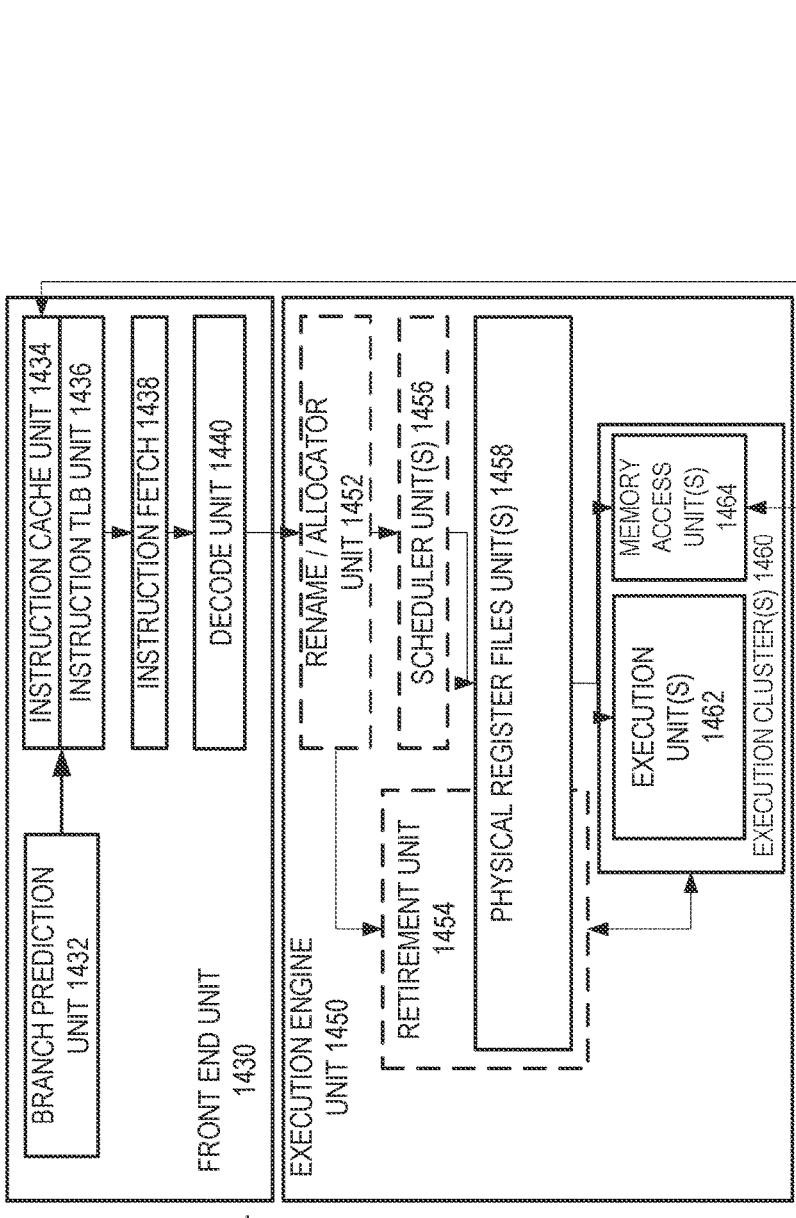
FIG. 14b is a block diagram illustrating both an example of an in-order architecture core and an example register renaming an out-of-order issue/execution architecture core to be included in a processor according to one or more examples of the present specification.

FIG. 14a is a block diagram illustrating both an example in-order pipeline and an example register renaming, out-of-order issue/execution pipeline. FIG. 14b is a block diagram illustrating both an embodiment of an in-order architecture core and an example register renaming, out-of-order issue/execution architecture core to be included in a processor. The examples of FIGS. 14a-14b may be configured to operate within the standardized interface for IP blocks disclosed in the present specification.

The solid lined boxes in FIGS. 14a-14b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 14a, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14b shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, microcode entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, PLAs, microcode read-only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservation stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 performs the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 15a-15b illustrate a block diagram of a more specific example in-order core architecture, which core would be one of several logic blocks (including other cores of the same type and/or different types) in a chip. The examples of FIGS. 15a-15b may be configured to operate within the standardized interface for IP blocks disclosed in the present specification.

The logic blocks communicate through a high-bandwidth interconnect network (e.g., a ring network) with some fixed function logic, memory I/O interfaces, and other necessary I/O logic, depending on the application.

FIG. 15a is a block diagram of a single processor core, along with its connection to the on-die interconnect network 1502 and with its local subset of the Level 2 (L2) cache 1504, according to one or more embodiments. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, other embodiments may use a different approach (e.g., use a single register set or include a communication path that allows data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15b is an expanded view of part of the processor core in FIG. 15a according to embodiments of the specification. FIG. 15b includes an L1 data cache 1506A, part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
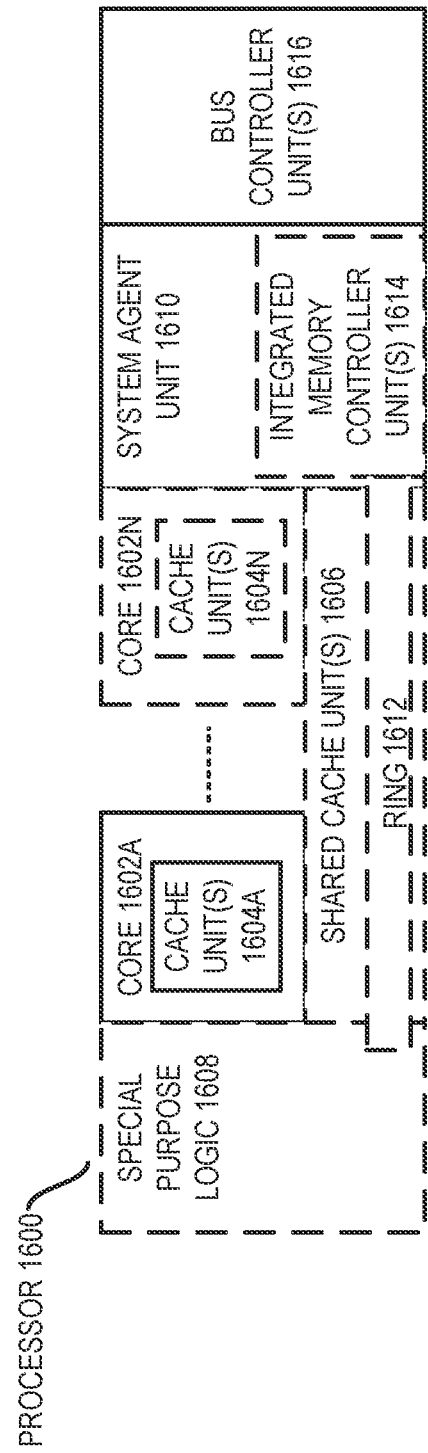
FIG. 16 is a block diagram of a processor that may have more than one core, may have an integrated memory controller, and may have integrated graphics according to one or more examples of the present specification.

FIG. 16 is a block diagram of a processor 1600 that may have more than one core, may have an integrated memory controller, and may have integrated graphics according to embodiments of the specification. The example of FIG. 16 may be configured to operate within the standardized interface for IP blocks disclosed in the present specification.

The solid lined boxes in FIG. 16 illustrate a processor 1600 with a single core 1602A, cache unit(s) 1604A, system agent 1610, a set of one or more bus controller units 1616, while the optional addition of the dashed lined boxes illustrates an alternative processor 1600 with multiple cores 1602A-N, cache units 1604A-N, a set of one or more integrated memory controller unit(s) 1614 in the system agent unit 1610, and special-purpose logic 1608.

Thus, different implementations of the processor 1600 may include: 1) a CPU with the special-purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special-purpose cores intended primarily for graphics and/or scientific throughput; and 3) a coprocessor with the cores 1602A-N being a large number of general purpose in-order cores. Thus, the processor 1600 may be a general purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602A-N.

In some embodiments, one or more of the cores 1602A-N are capable of multithreading. The system agent 1610 includes those components coordinating and operating cores 1602A-N. The system agent unit 1610 may include, for example, a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of executing the same instruction set, while others may be capable of executing only a subset of that instruction set or a different instruction set.

Example Computer Architectures

FIGS. 17-20 are block diagrams of example computer architectures, which may be configured to operate within the standardized interface for IP blocks disclosed in the present specification. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
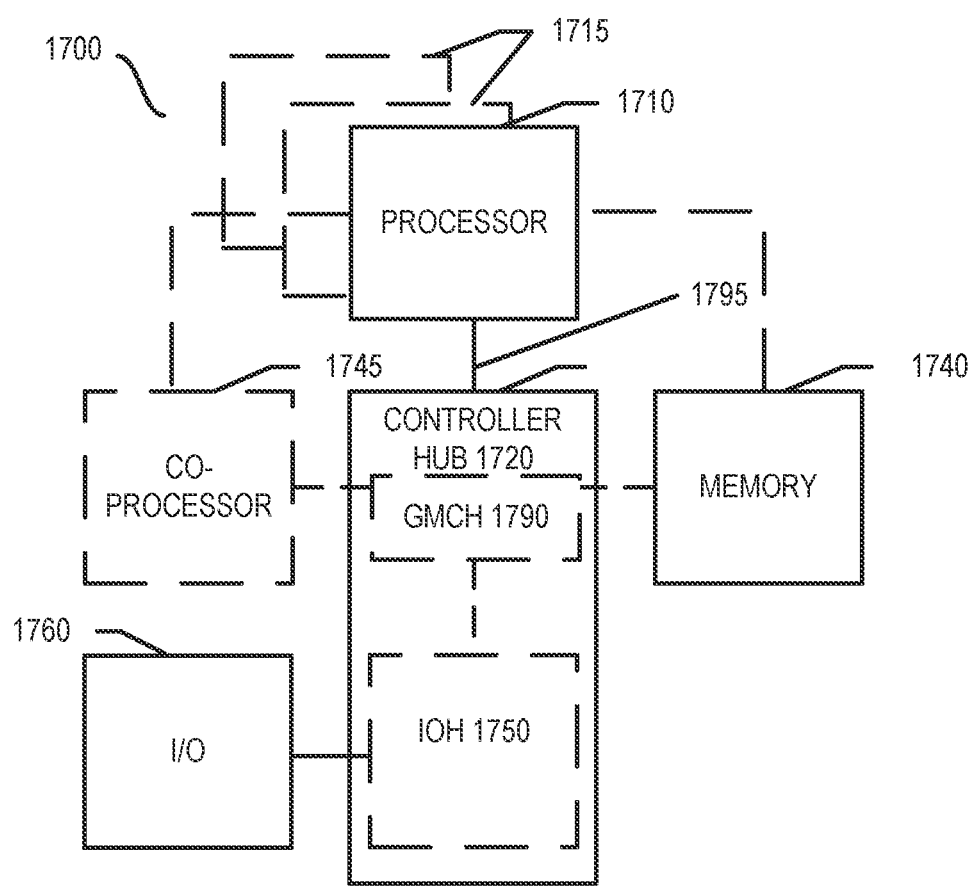
FIGS. 17-20 are block diagrams of computer architectures according to one or more examples of the present specification.

Referring now to FIG. 17, shown is a block diagram of a system 1700 in accordance with one embodiment. The system 1700 may include one or more processors 1710, 1715, which are coupled to a controller hub 1720. In one embodiment the controller hub 1720 includes a graphics memory controller hub (GMCH) 1790 and an input/output hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790.

Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multidrop bus, such as a frontside bus (FSB), point-to-point interface such as Ultra Path Interconnect (UPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accepts and executes the received coprocessor instructions.

Figure 18:
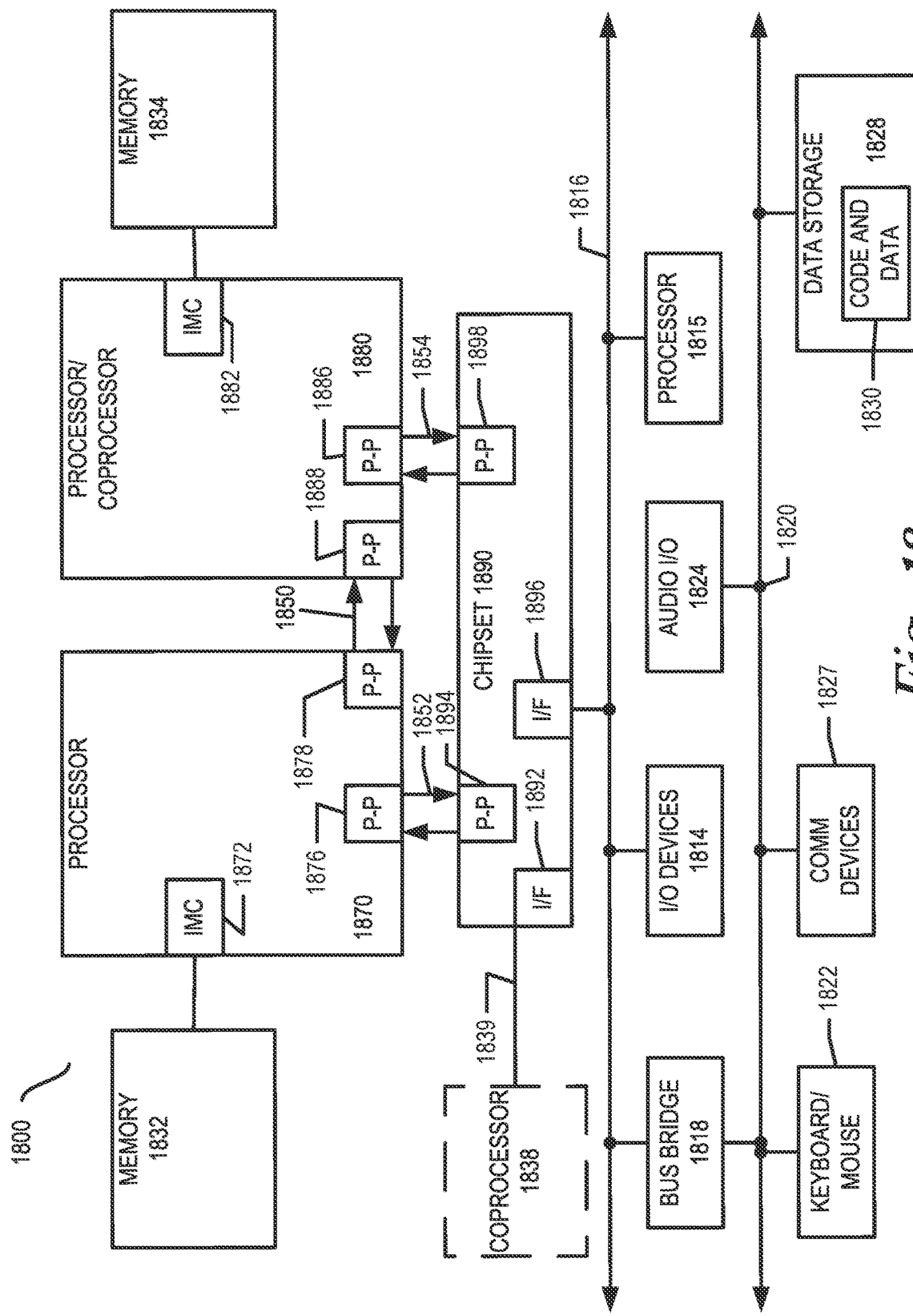

Referring now to FIG. 18, shown is a block diagram of a first more specific example system 1800. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point-to-point interface circuits 1876, 1894, 1886, 1898. Chipset 1890 may optionally exchange information with the coprocessor 1838 via a high performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via interfaces 1892 and 1896. In one embodiment, first bus 1816 may be a PCI bus, or a bus such as a PCI Express bus or another third generation IO interconnect bus, by way of nonlimiting example.

As shown in FIG. 18, various IO devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPUs, accelerators (such as, e.g., graphics accelerators or DSP units), field programmable gate arrays, or any other processor, are coupled to first bus 1816.

In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions or code and data 1830, in one embodiment. Further, an audio IO 1824 may be coupled to the second bus 1820. Note that other architectures are possible. For example, instead of the point-to-point architecture of FIG. 18, a system may implement a multidrop bus or other such architecture.

Figure 19:
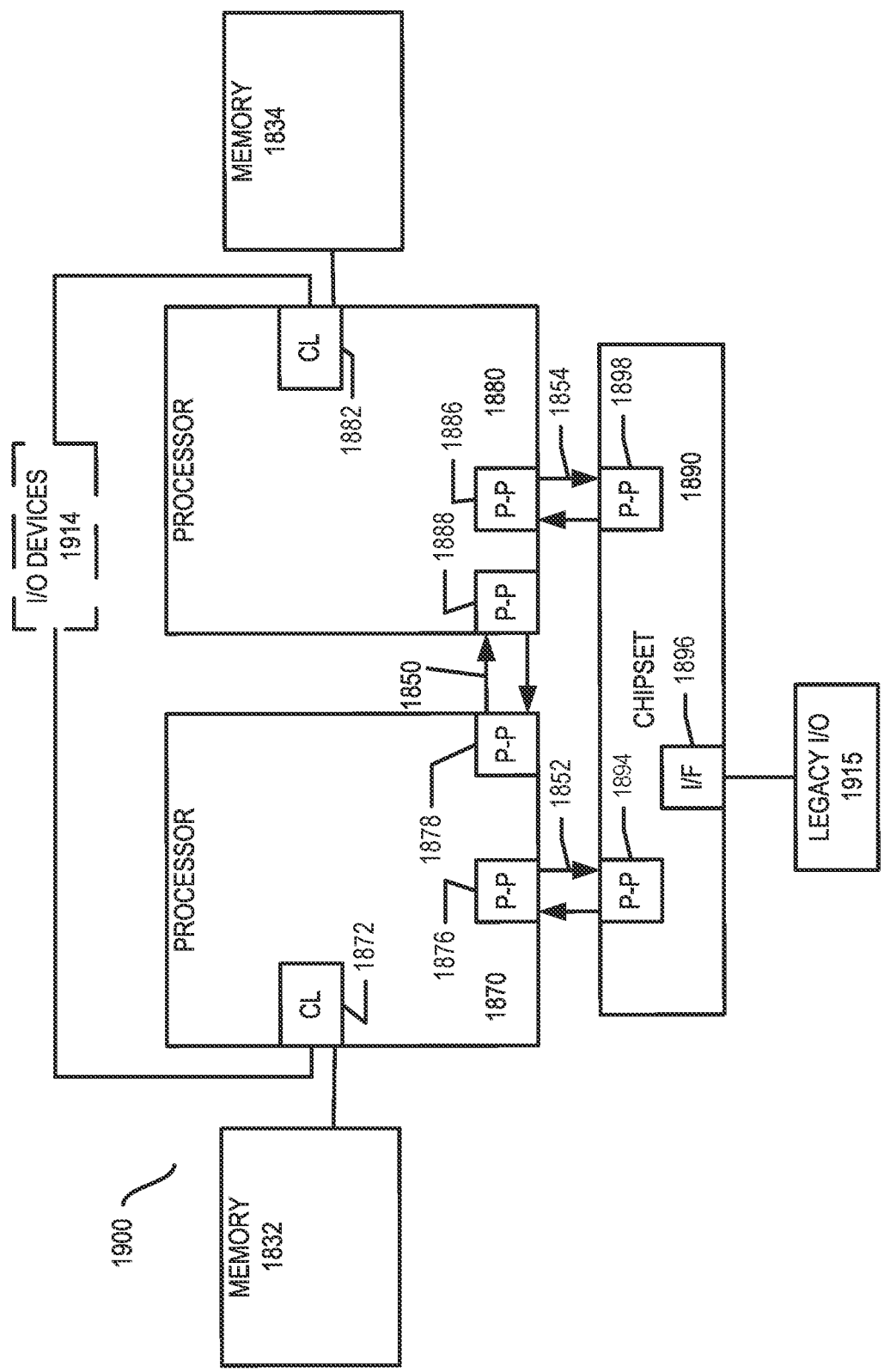

Referring now to FIG. 19, shown is a block diagram of a second more specific example system 1900. FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and IO control logic ("CL") 1872 and 1882, respectively. Thus, the CL 1872, 1882 include IMC units and include IO control logic. FIG. 19 illustrates that not only are the memories 1832, 1834 coupled to the CL 1872, 1882, but also that IO devices 1914 are also coupled to the control logic 1872, 1882. Legacy IO devices 1915 are coupled to the chipset 1890.

Figure 20:
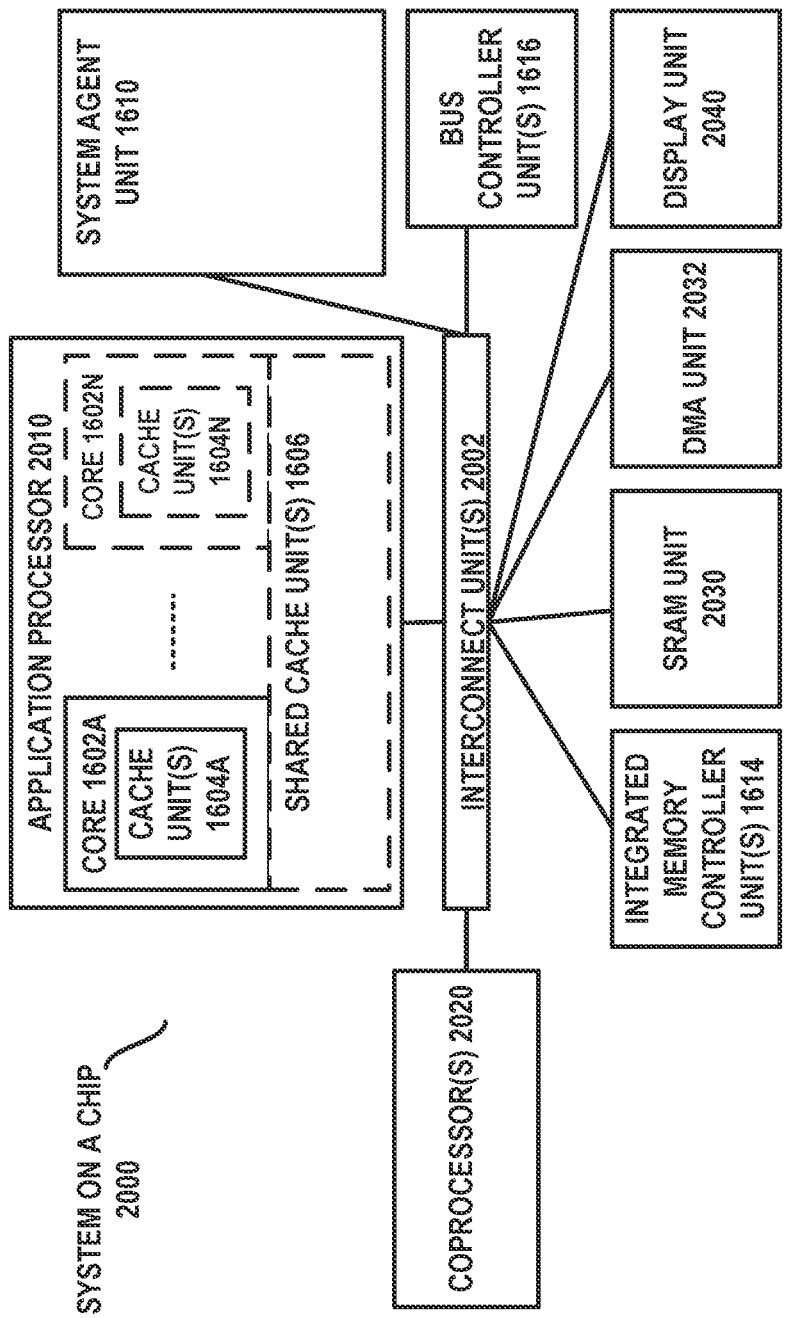

Referring now to FIG. 20, shown is a block diagram of a system-on-a-chip (SoC) 2000 in accordance with an embodiment. Similar elements in FIG. 16 bear like reference numerals. Also, dashed lined boxes are optional features on more advanced SoCs.

In FIG. 20, an interconnect unit(s) 2002 is coupled to: an application processor 2010 which includes a set of one or more cores 1602A-N and shared cache unit(s) 1606; a system agent unit 1610; a bus controller unit(s) 1616; IMC unit(s) 1614; a set of one or more coprocessors 2020 which may include integrated graphics logic, an image processor, an audio processor, and a video processor; a static random access memory (SRAM) unit 2030; a direct memory access (DMA) unit 2032; and a display unit 2040 for coupling to one or more external displays. In one embodiment, the coprocessor(s) 2020 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example, a DSP, a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard discs, any other type of disk including floppy disks, optical disks, compact disc read-only memories (CD-ROMs), compact disc rewritables (CD-RWs), and magneto-optical disks, semiconductor devices such as ROMs, random access memories (RAMs) such as DRAMs, SRAMs, erasable programmable read-only memories (EPROMs), flash memories, electrically erasable programmable read-only memories (EEPROMs), PCM, magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 is a block diagram contrasting the use of a software instruction converter to convert binary instructions in a source instruction set to binary instructions in a target instruction set. The example of FIG. 21 may be configured to operate within the standardized interface for IP blocks disclosed in the present specification.

In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid-state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a system-on-a-chip (SoC), comprising: a processor core; a fabric; a first intellectual property (IP) block communicatively coupled to the processor core via the fabric, the first IP block having a first microcontroller configured to provide a first microcontroller architecture; a first firmware load interface configured to provide a standardized hardware interface to the first microcontroller architecture, wherein the standardized hardware interface provides an architecture-agnostic mechanism to securely load a first firmware to the first intellectual property block; and logic to provide a loader to load a firmware to the first IP block via the first firmware load interface.

There is further disclosed an example SoC, wherein the first firmware load interface is integrated into the first IP block.

There is further disclosed an example SoC, wherein the first firmware load interface is external to the first IP block.

There is further disclosed an example SoC, wherein the first firmware load interface is an IP block discrete from the first IP block.

There is further disclosed an example SoC, further comprising: a second IP block having a second microcontroller, the second microcontroller having a second microcontroller architecture different from the first microcontroller architecture; and a second firmware load interface to provide the standardized hardware interface to securely load a second firmware to the second IP block.

There is further disclosed an example SoC, wherein securely loading the first firmware comprises a single-stage loading.

There is further disclosed an example SoC, wherein securely loading the first firmware comprises a multi-stage loading.

There is further disclosed an example SoC, wherein the multi-stage loading comprises loading by multiple agents at different stages of operation.

There is further disclosed an example SoC, wherein securely loading the first firmware comprises loading via a firmware push model.

There is further disclosed an example SoC, wherein securely loading the first firmware comprises loading via a firmware pull model.

There is further disclosed an example SoC, further comprising a basic input-output system (BIOS), wherein the logic to provide the loader comprises firmware instructions for the BIOS.

There is further disclosed an example SoC, wherein the logic to provide the loader comprises microcode instructions.

There is further disclosed an example SoC, wherein the processor core comprises a set of registers to control the securely loading the firmware.

There is further disclosed an example SoC, further comprising a security engine to securely load the first firmware to the first IP block.

There is further disclosed an example SoC, wherein the security engine is implemented at least partly in microcode.

There is further disclosed an example SoC, wherein the security engine is an IP block.

There is also disclosed an example intellectual property (IP) block, comprising: a microcontroller; and a firmware dashboard, the firmware dashboard comprising: an IP-facing interface comprising circuitry to interface internally with the IP block; and a system-facing interface comprising circuitry to provide a standardized load interface for a firmware of the IP block.

There is further disclosed an example IP block, further comprising an internal cryptographic module configured to cryptographically verify the firmware.

There is further disclosed an example IP block, wherein the IP block is configured to receive from the system a signal, message, or interrupt to indicate that the firmware has been verified external to the IP block.

There is further disclosed an example IP block, further comprising a read-only memory (ROM), wherein the IP-facing interface comprises instructions to populate the ROM with the firmware.

There is further disclosed an example IP block, further comprising a static random access memory (SRAM) or register file, wherein the IP-facing interface comprises instructions to populate the SRAM or register file with the firmware.

There is further disclosed an example IP block, wherein the IP block is configured to receive the address and size of an IP-block-addressable memory location of the system, the memory location to contain the firmware.

There is further disclosed an example IP block, wherein the IP block lacks an internal memory to hold the firmware, and wherein the IP block is configured to execute the firmware directly from an addressable location in main memory for the system.

There is also disclosed an example integrated circuit, comprising: a first interface configured to communicatively couple to an intellectual property (IP) block; a second interface configured to communicatively couple to a system-on-a-chip (SoC); and circuitry to provide bridge and wrapper functionality between the IP block and the SoC, wherein the bridge and wrapper functionality are to provide a standardized and architecture-agnostic load flow to load a firmware to the IP block, and to carry out the load flow in a manner specific to an architecture of the IP block.

There is further disclosed an example integrated circuit, wherein the load flow supports a firmware push model for the IP block.

There is further disclosed an example integrated circuit, wherein the load flow supports a firmware pull model for the IP block.

There is further disclosed an example integrated circuit, wherein the load flow supports an on-IP firmware verification security model.

There is further disclosed an example integrated circuit, wherein the load flow supports an off-IP firmware verification security model.

What is claimed is:

1. A system-on-a-chip (SoC), comprising:
a processor core;
a fabric comprising circuitry to communicatively couple the processor core to one or more intellectual property (IP) blocks;
a first intellectual property (IP) block communicatively coupled to the processor core via the fabric, the first IP block having a first microcontroller configured to provide a first microcontroller architecture;
a first firmware load interface configured to provide a standardized hardware interface to the first microcontroller architecture, wherein the standardized hardware interface provides an architecture-agnostic mechanism to securely load a first firmware to the first intellectual property block; and
circuitry to provide a loader to load a firmware to the first IP block via the first firmware load interface, comprising an IP-facing interface that provides first circuitry specific to the IP, and a system-facing interface that provides second circuitry common to a set of IP blocks or classes of IP blocks.

2. The SoC of claim 1, wherein the first firmware load interface is integrated into the first IP block.

3. The SoC of claim 1, wherein the first firmware load interface is external to the first IP block.

4. The SoC of claim 1, wherein the first firmware load interface is an IP block discrete from the first IP block.

5. The SoC of claim 1, further comprising:
a second IP block having a second microcontroller, the second microcontroller having a second microcontroller architecture different from the first microcontroller architecture; and
a second firmware load interface to provide the standardized hardware interface to securely load a second firmware to the second IP block.

6. The SoC of claim 1, wherein securely loading the first firmware comprises a single-stage loading.

7. The SoC of claim 1, wherein securely loading the first firmware comprises a multi-stage loading.

8. The SoC of claim 7, wherein the multi-stage loading comprises loading by multiple agents at different stages of operation.

9. The SoC of claim 1, wherein the processor core comprises a set of registers to control securely loading the firmware.

10. The SoC of claim 1, further comprising a security circuit to securely load the first firmware to the first IP block.

11. An intellectual property (IP) block, comprising:
a microcontroller; and
a firmware dashboard circuit, the firmware dashboard circuit comprising:
an IP-facing interface comprising first circuitry to interface internally with the IP block according to an IP block flavor of the IP block; and
a system-facing interface comprising second circuitry to provide a standardized load interface for a firmware of the IP block.

12. The IP block of claim 11, further comprising an internal cryptographic module configured to cryptographically verify the firmware.

13. The IP block of claim 11, further comprising a read-only memory (ROM), wherein the IP-facing interface comprises instructions to populate the ROM with the firmware.

14. The IP block of claim 11, wherein the IP block is configured to receive the address and size of an IP-block-addressable memory location of the system, the memory location to contain the firmware.

15. The IP block of claim 11, wherein the IP block lacks an internal memory to hold the firmware, and wherein the IP block is configured to execute the firmware directly from an addressable location in main memory for the system.

16. An integrated circuit, comprising:
a first interface circuit configured to communicatively couple to an intellectual property (IP) block;
a second interface circuit configured to communicatively couple to a system-on-a-chip (SoC); and
circuitry to provide bridge and wrapper functionality between the IP block and the SoC, wherein the bridge and wrapper functionality are to, based on an IP block flavor, provide a standardized and architecture-agnostic load flow to load a firmware to the IP block, and to carry out the load flow in a manner specific to an architecture of the IP block.

17. The integrated circuit of claim 16, wherein the load flow supports a firmware push model for the IP block.

18. The integrated circuit of claim 16, wherein the load flow supports a firmware pull model for the IP block.

19. The integrated circuit of claim 16, wherein the load flow supports an on-IP firmware verification security model.

20. The integrated circuit of claim 16, wherein the load flow supports an off-IP firmware verification security model.

* * * * *